(12) United States Patent
Wang et al.

(10) Patent No.: US 11,773,011 B1
(45) Date of Patent: Oct. 3, 2023

(54) GLASS ASSEMBLY INCLUDING A CONDUCTIVE FEATURE AND METHOD OF MANUFACTURING THEREOF

(71) Applicant: AGC Automotive Americas Co., Alpharetta, GA (US)

(72) Inventors: Jiangping Wang, Novi, MI (US); Joel Smith, Battle Creek, MI (US); Timothy D. Peck, White Lake, MI (US); Frederick Maurice Schaible, III, Ann Arbor, MI (US); Abdelhalim Mohamed, Canton, MI (US); Christopher A. Imeson, Lasalle (CA)

(73) Assignee: AGC Automotive Americas Co., Alpharetta, GA (US)

( * ) Notice: Subject to any disclaimer, the term of this patent is extended or adjusted under 35 U.S.C. 154(b) by 0 days.

(21) Appl. No.: 17/860,576

(22) Filed: Jul. 8, 2022

(51) Int. Cl.
*C03C 17/00* (2006.01)
*B32B 17/10* (2006.01)
(Continued)

(52) U.S. Cl.
CPC ...... *C03C 17/001* (2013.01); *B32B 17/10036* (2013.01); *B32B 17/10385* (2013.01);
(Continued)

(58) Field of Classification Search
CPC ... C03C 17/001; C03C 17/28; C03C 2217/70; C03C 2218/119; C03C 2218/32; B32B 17/10036; B32B 17/10385; B32B 17/10935; B32B 37/24; B32B 38/145; B32B 2037/243; B32B 2250/03; B32B 2255/24; B32B 2307/202; B32B 2307/412; B32B 2310/0831; B32B 2315/08; B32B 2457/00; B32B 2605/006; B32B 2605/08
See application file for complete search history.

(56) References Cited

U.S. PATENT DOCUMENTS

| 3,444,732 A | 5/1969 | McKinley et al. |
| 4,668,270 A | 5/1987 | Ramus |
(Continued)

FOREIGN PATENT DOCUMENTS

| CN | 106335291 A | 1/2017 |
| EP | 2060546 A1 | 5/2009 |
(Continued)

OTHER PUBLICATIONS

English language abstract and machine-assisted English translation for CN 1106335291 A extracted from espacenet.com database on Jul. 13, 2022, 9 pages.

(Continued)

*Primary Examiner* — Vishal I Patel
(74) *Attorney, Agent, or Firm* — Howard & Howard Attorneys PLLC

(57) ABSTRACT

A method of manufacturing a glass assembly to have a conductive feature includes a step of forming a glass substrate that is curved. The method also includes digitally-applying a conductive ink without a mask onto a surface of the curved glass substrate. The method further includes curing the conductive ink to form the conductive feature on the surface of the curved glass substrate, with the conductive feature having a resolution of greater than 200 dots per inch.

19 Claims, 15 Drawing Sheets

(51) Int. Cl.
  *B32B 38/00* (2006.01)
  *B32B 37/24* (2006.01)
  *C03C 17/28* (2006.01)

(52) U.S. Cl.
  CPC ........ *B32B 17/10935* (2013.01); *B32B 37/24* (2013.01); *B32B 38/145* (2013.01); *C03C 17/28* (2013.01); *B32B 2037/243* (2013.01); *B32B 2250/03* (2013.01); *B32B 2255/24* (2013.01); *B32B 2307/202* (2013.01); *B32B 2307/412* (2013.01); *B32B 2310/0831* (2013.01); *B32B 2315/08* (2013.01); *B32B 2457/00* (2013.01); *B32B 2605/006* (2013.01); *B32B 2605/08* (2013.01); *C03C 2217/70* (2013.01); *C03C 2218/119* (2013.01); *C03C 2218/32* (2013.01)

(56) References Cited

U.S. PATENT DOCUMENTS

| | | |
|---|---|---|
| 4,744,844 A | 5/1988 | Hurst |
| 4,786,784 A | 11/1988 | Nikodem et al. |
| RE33,297 E | 8/1990 | Ramus et al. |
| 5,565,237 A | 10/1996 | Bartetzko |
| 6,602,371 B2 | 8/2003 | Veerasamy |
| 7,132,625 B2 | 11/2006 | Voeltzel |
| 7,727,634 B2 | 6/2010 | Yacovone |
| 7,803,221 B2 | 9/2010 | Magdassi et al. |
| 7,955,470 B2 | 6/2011 | Kapp et al. |
| 7,955,696 B2 * | 6/2011 | Baikerikar ............... H01B 1/22 428/689 |
| 8,022,333 B2 | 9/2011 | Maeuser |
| 9,011,628 B2 | 4/2015 | Elwakil et al. |
| 9,090,120 B2 | 7/2015 | Pires et al. |
| 9,158,172 B2 | 10/2015 | Sbar et al. |
| 9,556,071 B2 | 1/2017 | Finley et al. |
| 9,630,396 B2 | 4/2017 | Orr |
| 9,986,669 B2 | 5/2018 | Uprety et al. |
| 10,232,592 B2 | 3/2019 | Loccufier et al. |
| 10,278,237 B2 | 4/2019 | Krause et al. |
| 10,374,330 B1 | 8/2019 | Bennett et al. |
| 10,420,210 B2 | 9/2019 | Uprety et al. |
| 10,549,508 B2 | 2/2020 | Cloots et al. |
| 10,553,964 B2 | 2/2020 | Bennett et al. |
| 10,752,782 B2 | 8/2020 | Loccufier |
| 10,792,955 B2 | 10/2020 | Ito et al. |
| 10,819,002 B2 | 10/2020 | Zhu et al. |
| 10,843,497 B2 | 11/2020 | Minamidate et al. |
| 11,027,528 B2 | 6/2021 | Laluet et al. |
| 11,031,671 B2 | 6/2021 | Xia et al. |
| 11,075,450 B2 | 7/2021 | Yong et al. |
| 11,097,978 B2 | 8/2021 | Hori et al. |
| 11,130,314 B2 | 9/2021 | Yoon et al. |
| 11,260,629 B2 | 3/2022 | Cleary et al. |
| 11,362,473 B2 | 6/2022 | Yeh |
| 2008/0206504 A1 | 8/2008 | Hayes et al. |
| 2008/0233371 A1 | 9/2008 | Hayes et al. |
| 2008/0286542 A1 | 11/2008 | Hayes et al. |
| 2010/0098917 A1 | 4/2010 | Lyon |
| 2013/0258436 A1 | 10/2013 | Podbelski et al. |
| 2016/0185101 A1 | 6/2016 | Lee et al. |
| 2016/0297222 A1 | 10/2016 | Allington et al. |
| 2017/0342282 A1 | 11/2017 | Torfs et al. |
| 2018/0257978 A1 | 9/2018 | Minamidate et al. |
| 2018/0311892 A1 | 11/2018 | Abbott, Jr. et al. |
| 2019/0381786 A1 * | 12/2019 | Watanabe ............. B41F 17/006 |
| 2020/0122436 A1 | 4/2020 | Mannheim Astete et al. |
| 2020/0171800 A1 | 6/2020 | Cleary et al. |
| 2020/0215796 A1 | 7/2020 | Butler et al. |
| 2020/0239358 A1 | 7/2020 | Urata et al. |
| 2020/0290318 A1 | 9/2020 | Mannheim Astete et al. |
| 2020/0310014 A1 | 10/2020 | Bard et al. |
| 2020/0391577 A1 | 12/2020 | Bard et al. |
| 2020/0392358 A1 | 12/2020 | Courtet et al. |
| 2021/0078299 A1 | 3/2021 | Keller |
| 2021/0178799 A1 | 6/2021 | Cofler et al. |
| 2021/0394488 A1 | 12/2021 | Sadakane et al. |

FOREIGN PATENT DOCUMENTS

| | | | |
|---|---|---|---|
| EP | 2168774 B1 | 2/2011 | |
| EP | 2436527 A2 | 4/2012 | |
| EP | 3034312 A1 | 6/2016 | |
| EP | 2054352 B1 | 1/2019 | |
| EP | 1644295 B1 | 8/2020 | |
| EP | 3549389 B1 | 2/2021 | |
| EP | 3799587 A1 | 4/2021 | |
| EP | 3515654 B1 | 6/2021 | |
| JP | 2003017171 A | 1/2003 | |
| WO | 9118757 A1 | 12/1991 | |
| WO | 2012022904 A1 | 2/2012 | |
| WO | 2012028820 A1 | 3/2012 | |
| WO | 2021084279 A1 | 5/2021 | |
| WO | 2021090243 A1 | 5/2021 | |
| WO | WO-2021094625 A1 * | 5/2021 | ............... B05D 1/38 |
| WO | 2021105422 A1 | 6/2021 | |
| WO | 2021110723 A1 | 6/2021 | |
| WO | 2021204551 A1 | 10/2021 | |
| WO | 2021209433 A1 | 10/2021 | |
| WO | 2021220206 A1 | 11/2021 | |
| WO | 2021233703 A1 | 11/2021 | |
| WO | 2021233807 A1 | 11/2021 | |
| WO | 2022057951 A1 | 3/2022 | |

OTHER PUBLICATIONS

English language abstract for EP 1 644 295 B1 and machine-assisted English translation for equivalent WO 2005/003048 A1 extracted from espacenet.com database on Jul. 13, 2022, 12 pages.
English language abstract for EP 3 515 654 B1 extracted from espacenet.com database on Jul. 13, 2022, 2 pages.
English language abstract and machine-assisted English translation for JP 2003-017171 A extracted from espacenet. com database on Jul. 13, 2022, 12 pages.
English language abstract and machine-assisted English translation for WO 2012/022904 A1 extracted from espacenet.com database on Jul. 13, 2022, 10 pages.
English language abstract and machine-assisted English translation for WO 2012/028820 A1 extracted from espacenet.com database on Jul. 13, 2022, 22 pages.
English language abstract and machine-assisted English translation for WO 2021/105422 A1 extracted from espacenet.com database on Jul. 13, 2022, 13 pages.
English language abstract and machine-assisted English translation for WO 2021/204551 A1 extracted from espacenet.com database on Jul. 13, 2022, 23 pages.
English language abstract and machine-assisted English translation for WO 2021/209433 A1 extracted from espacenet.com database on Jul. 13, 2022, 19 pages.
English language abstract and machine-assisted English translation for WO 2021/233703 A1 xtracted from espacenet.com database on Jul. 13, 2022, 9 pages.
English language abstract and machine-assisted English translation for WO 2022/057951 A1 extracted from espacenet.com database on Jul. 13, 2022, 16 pages.
The Usglass News Network (USGNN), "NSG Group and University of Cambridge Sowing Seeds for Future Glass Applications", https://www.usglassmag.com/2020/10/nsg-group-and-university-of-cambridge-sowing-seeds-for-future-glass-applications/, Oct. 23, 2020, 2 pages.
United States Non-Provisional U.S. Appl. No. 17/860,296, filed Jul. 8, 2022.
United States Non-Provisional U.S. Appl. No. 17/860,411, filed Jul. 8, 2022.
United States Non-Provisional U.S. Appl. No. 17/860,488, filed Jul. 8, 2022.

* cited by examiner

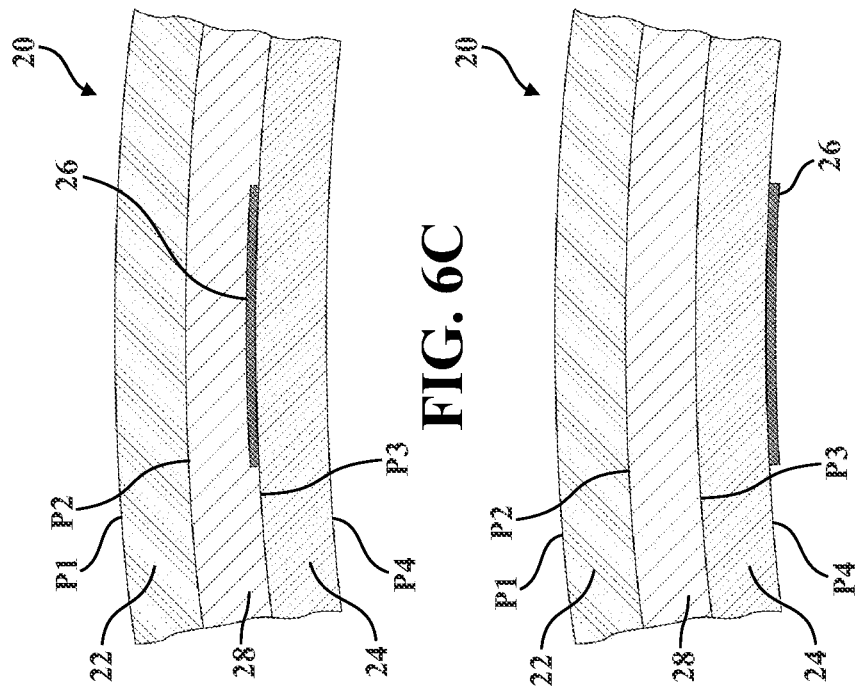
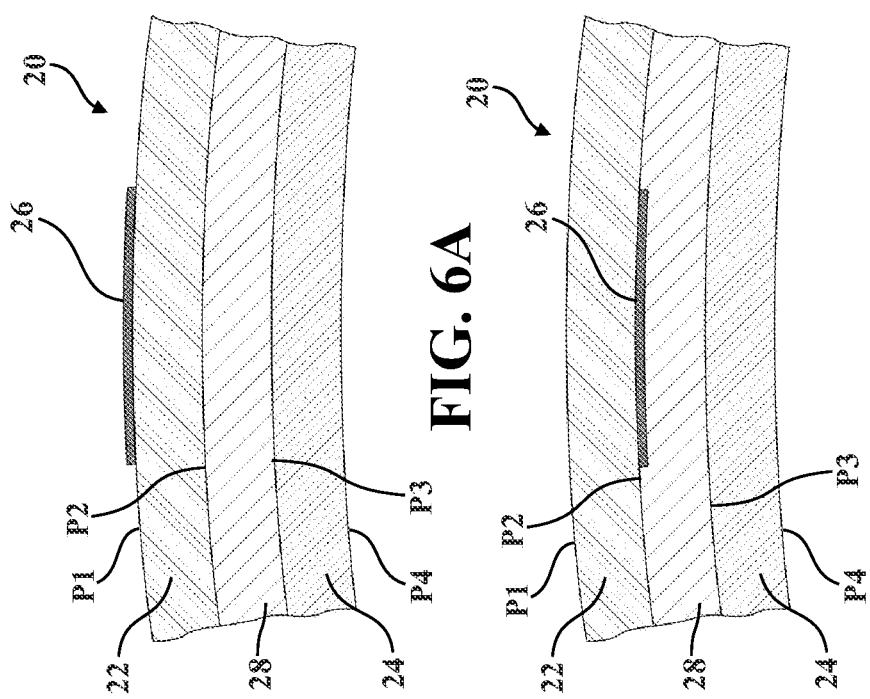

GLASS ASSEMBLY INCLUDING A CONDUCTIVE FEATURE AND METHOD OF MANUFACTURING THEREOF

TECHNICAL FIELD

The present disclosure relates generally to glass assemblies and methods of manufacturing glass assemblies, and more specifically to glass assemblies including a conductive feature and methods of manufacturing glass assemblies to include the conductive feature.

BACKGROUND

Glass assemblies used in automotive contexts often include conductive features. These conductive features include heating elements configured to be energized to defrost and/or defog at least a portion of the glass assembly and antennas configured to transmit and/or receive radio signals. These conductive features are typically formed by depositing a conductive paste, often comprising conductive particles and ceramic frit, onto a flat glass substrate and subsequently firing the glass substrate at temperatures in excess of 500 degrees Celsius to fuse the conductive paste into the glass substrate. The glass substrate including the fused conductive paste is typically fired at temperatures in excess of 600 degrees Celsius to bend the glass substrate into a desired shape. Problematically, when glass assemblies including conductive paste are fired at these high temperatures, the portion of the glass assembly including the conductive paste absorbs heat differently than the rest of the glass assembly which does not include the conductive paste. For example, the portion of the glass assembly including the conductive paste is at a temperature of 650 degrees Celsius during firing, while the rest of the glass assembly (not including conductive paste) is at a temperature of 640 degrees Celsius during firing. Accordingly, the portion of the glass assembly including the conductive paste will have a softness that is than the rest of the glass assembly which does not include the conductive paste. The different softness of the portion of the glass assembly including the conductive paste and the softness of the rest of the glass assembly causes each portion of the glass assembly to deform differently, thereby causing significant optical distortion of the glass assembly and affecting the strength of the glass assembly. This optical distortion has a particularly adverse effect on the performance of optical sensors used for semi-autonomous or autonomous driving, including cameras and LIDAR sensors.

Additionally, conventional analog printing processes (e.g. screen-printing, spray-printing with a mask, and the like) for depositing conductive paste are generally limited to a maximum resolution of about 200 dots per inch and typically require a mask. As an example, in a conventional screen-printing process, a mask (i.e., a "screen") defining voids corresponding to a desired area to be printed is arranged over a substrate. The conductive paste is deposited over the mask in a manual process, such as with a roller, squeegee, brush, spray, or the like. These manual processes often require depositing excess conductive paste over the mask to ensure that all of the voids of the mask are adequately filled. Furthermore, conventional analog printing processes are typically carried out on flat substrates because it is a challenge to accurately and repeatably print onto a curved substrate.

In view of the above, there is a need for an improved method of manufacturing a glass assembly having a conductive feature.

SUMMARY

The present disclosure includes a method of manufacturing a glass assembly to have a conductive feature including at least one conductive line. The method includes forming a glass substrate that is curved. The method also includes digitally-applying a conductive ink without a mask onto a surface of the curved glass substrate. The method further includes curing the conductive ink to form the conductive feature on the surface of the curved glass substrate, with the conductive feature having a resolution of greater than 200 dots per inch. Advantageously, by digitally-applying the conductive ink after forming the curved glass substrate, the optical distortion caused by firing a glass assembly including a conventional conductive paste is prevented. Furthermore, due to the precise control afforded by digitally-applying the conductive ink, the conductive ink is deposited with significantly tighter tolerances and may form significantly more detailed features than conventional analog printing processes.

BRIEF DESCRIPTION OF THE DRAWINGS

Advantages of the present disclosure will be readily appreciated as the same becomes better understood by reference to the following detailed description when considered in connection with the accompanying drawings.

FIGS. 6A-6D are cross-sectional schematic representations of examples of a laminated glass assembly including a conductive feature.

DETAILED DESCRIPTION

Figure 1:
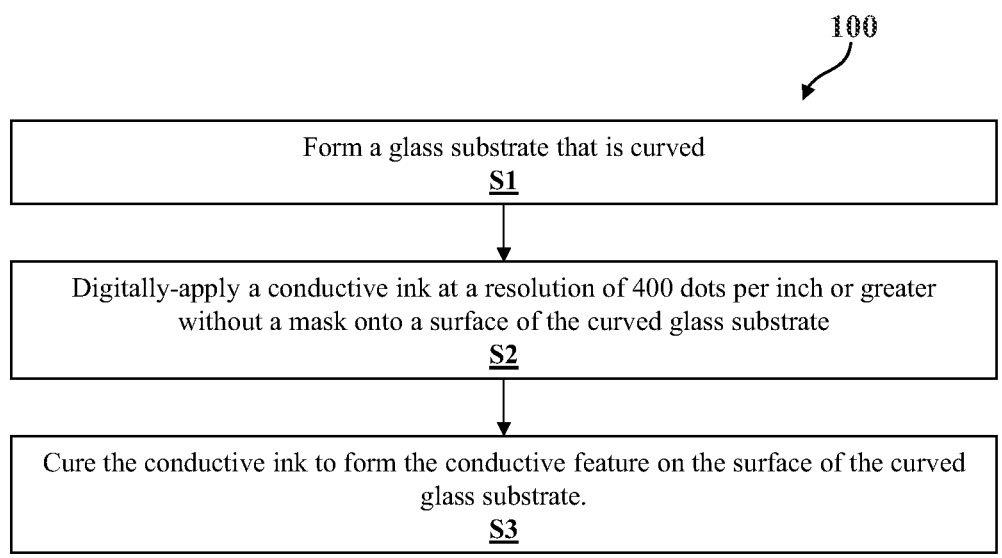
FIG. 1 is a flowchart illustrating the method of the present disclosure.
Figure 7:
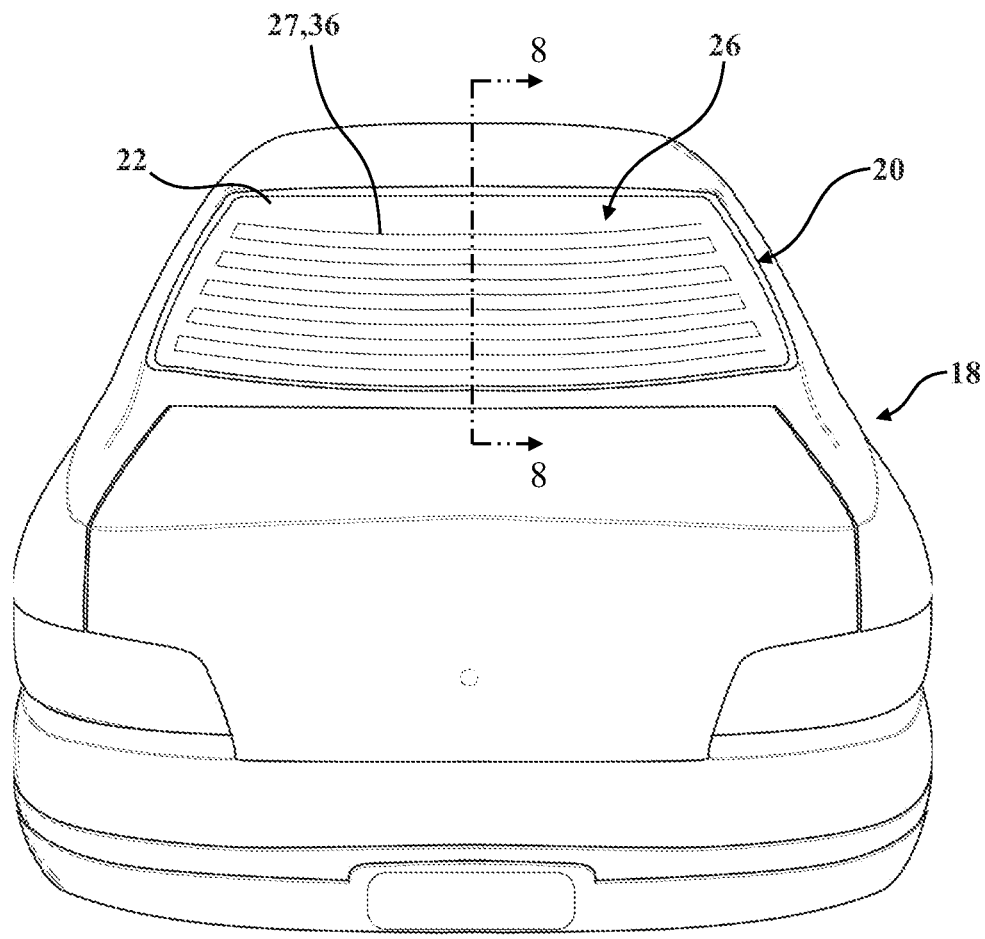
FIG. 7 is a rear perspective view of a vehicle including a rear glass assembly including a conductive feature defining a heating element.
Figure 9:
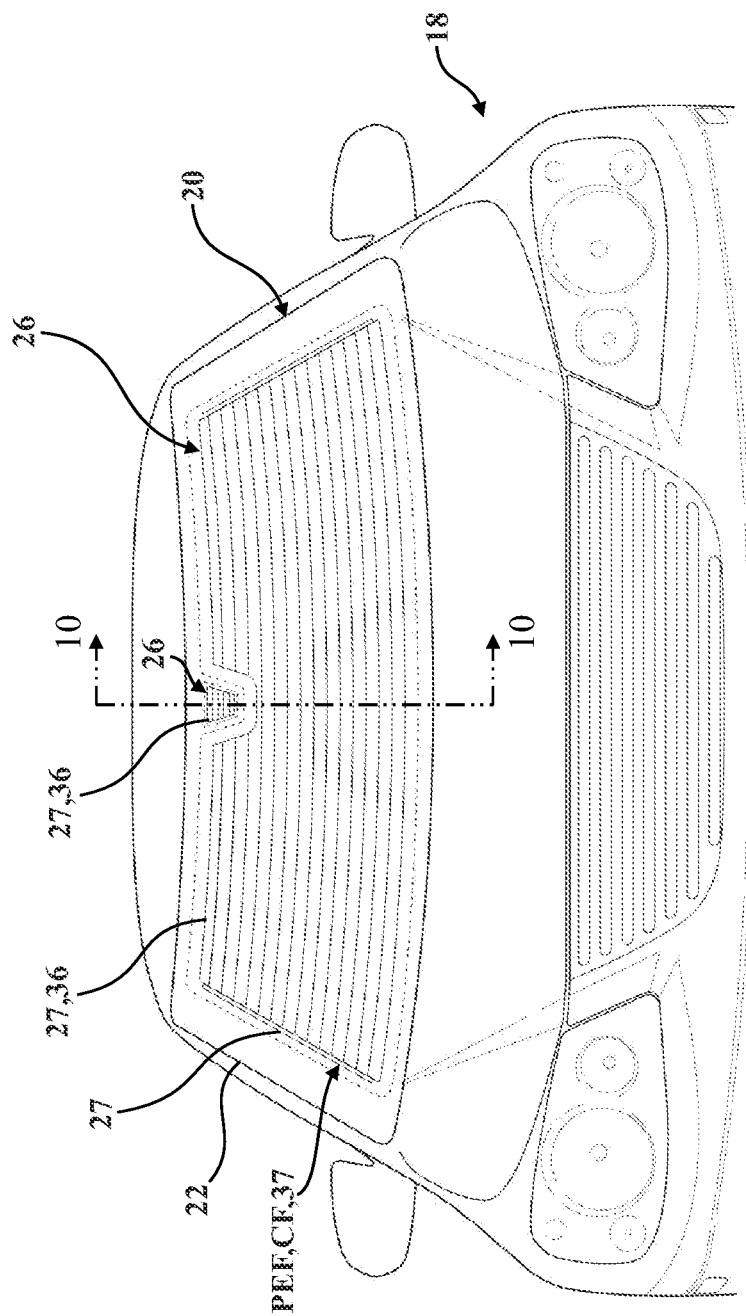
FIG. 9 is a front view of a vehicle including a front glass assembly including a conductive feature defining a heating element.
Figure 11:
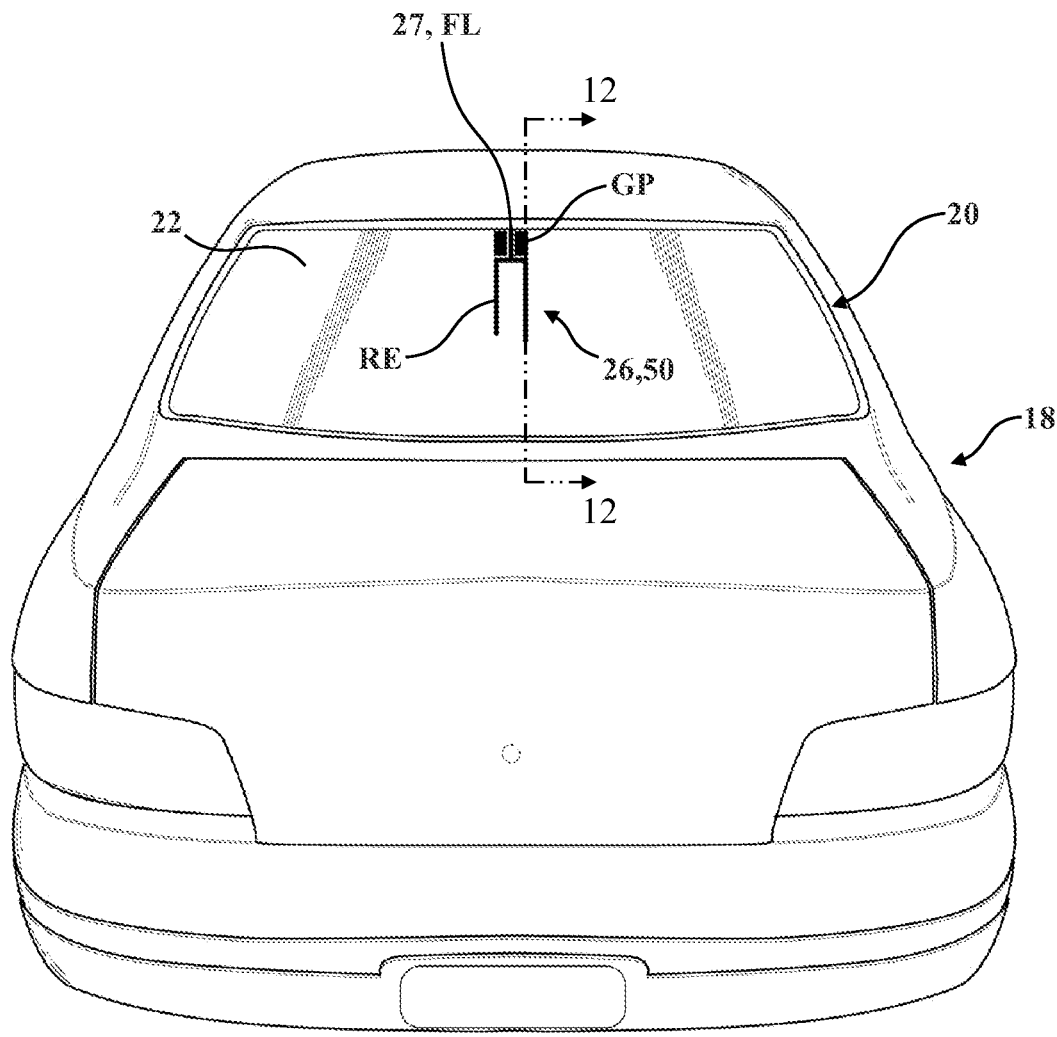
FIG. 11 is a rear perspective view of a vehicle including a rear glass assembly including a conductive feature defining an antenna.
Figure 12:
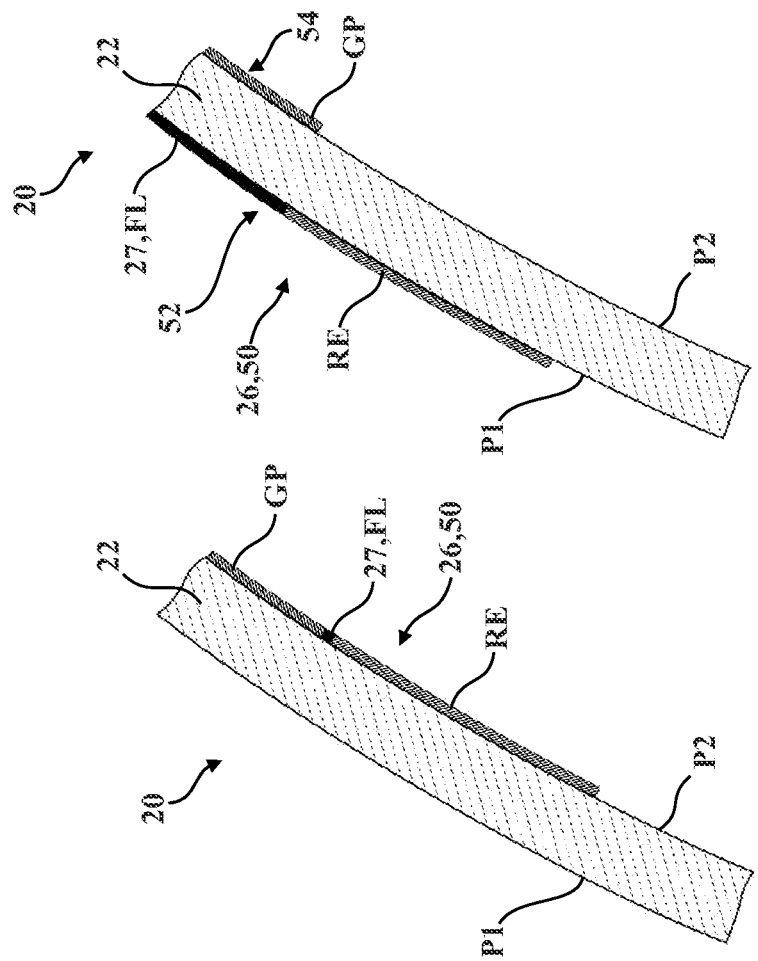
FIGS. 12A-12C are cross-sectional schematic representations of examples of the glass assembly of FIG. 11 taken along line 12-12.
Figure 13:
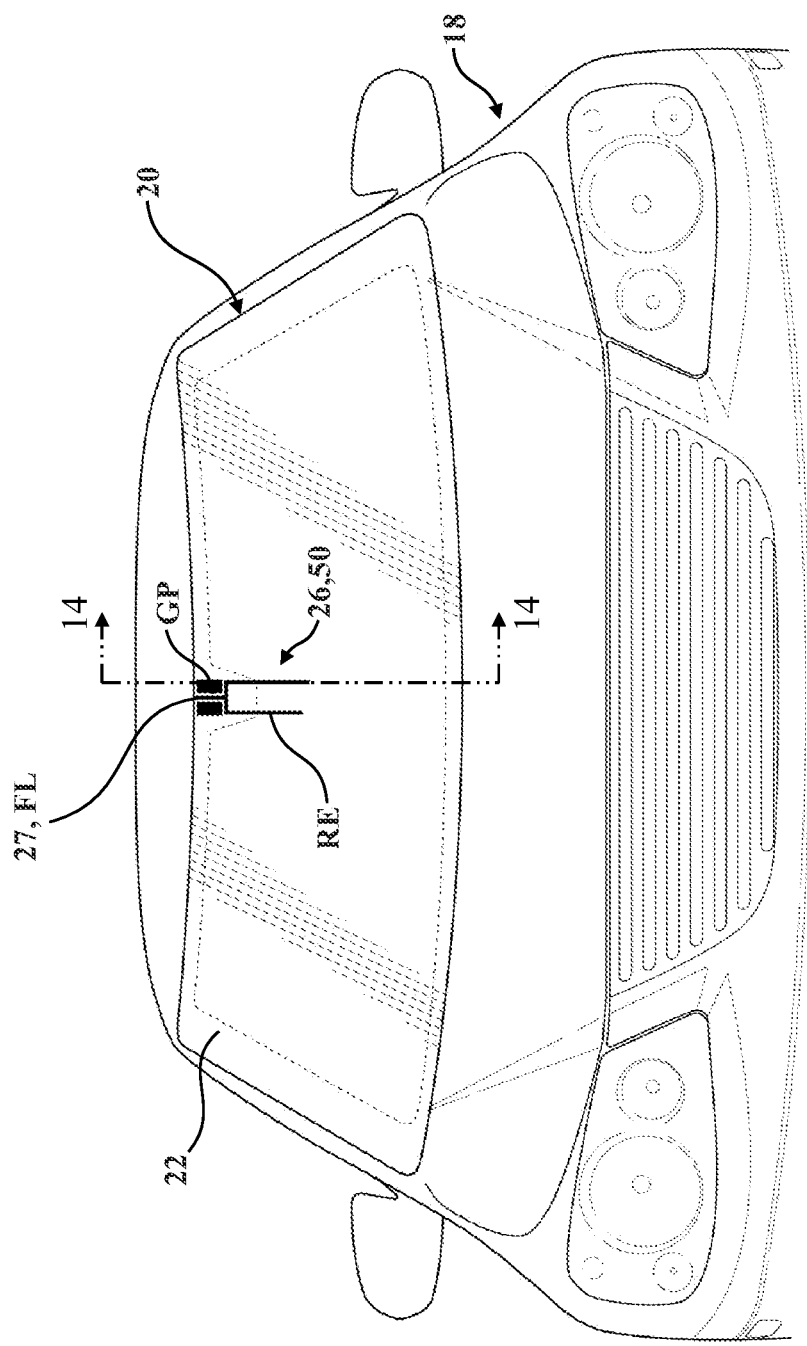
FIG. 13 is a front view of a vehicle including a front glass assembly including a conductive feature defining an antenna.

Referring to the drawings, wherein like reference numerals are used to identify like or identical components in the various views, FIG. 1 schematically illustrates a method 100 of forming a glass assembly 20 to have a conductive feature 26 including at least one conductive line 27. In one example, the glass assembly 20 may be used in an automotive context as a window for a vehicle 18, such as a windshield, side window, quarter window, rear window, and the like. For example, FIGS. 7 and 11 show a vehicle 18 including a rear glass assembly 20 formed according to the method 100 to include the conductive feature 26 including the at least one conductive line 27. FIGS. 9 and 13 show a vehicle 18 including a front glass assembly 20 formed according to the method 100 to include the conductive feature 26 including the at least one conductive line 27. Of course, it is to be appreciated that the method 100 of forming the glass assembly 20 can be outside the automotive context.

Referring to FIGS. 1-3B, the method 100 of forming a glass assembly 20 includes the steps of: step S1 of forming a glass substrate 22 that is curved, step S2 of digitally-applying a conductive ink CI without a mask onto a surface of the curved glass substrate 22, and step S3 of curing the conductive ink CI to form the conductive feature 26 including the at least one conductive line 27 on the surface of the curved glass substrate 22, with the conductive feature 26 having a resolution of greater than 200 dots per inch. Description of each of the steps S1, S2, S3 of the method 100 is included in further detail below.

Figure 2:
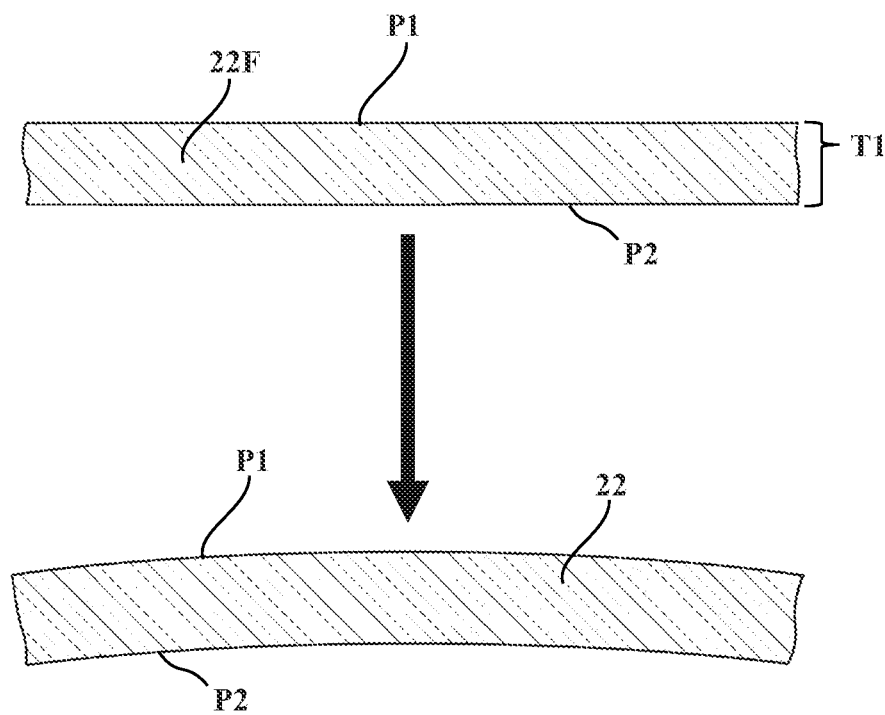
FIG. 2 is a cross-sectional schematic representation of a step of forming a glass substrate that is curved.

As described above, step S1 of the method 100 includes forming a glass substrate 22 that is curved. Referring to FIG. 2, the curved glass substrate 22 may be formed to have an outer surface (P1) and an opposing inner surface (P2). In one example, the P2 surface may be arranged to face the interior of the vehicle 18 when the glass assembly 20 is installed in the vehicle 18, and the P1 surface may be arranged to face outward from the vehicle 18 when the glass assembly 20 is installed in the vehicle 18.

With continued reference to FIG. 2, in one example of step S1, the curved glass substrate 22 is initially formed as a flat glass sheet 22F. The flat glass sheet 22F may be produced using any suitable flat glass manufacturing process including, but not limited to, a float process. The flat glass sheet 22F may be comprised of any suitable glass composition including, but not limited to, soda-lime glass, aluminosilicate glass, borosilicate glass, boro-aluminosilicate glass, and the like.

With continued reference to FIG. 2, after the formation of the flat glass sheet 22F, the flat glass sheet 22F is bent to form the curved glass substrate 22. The flat glass sheet 22F may be bent using any suitable glass bending process including, but not limited to, press bending, gravity bending (i.e., sag bending), roll forming, or cold bending. The flat glass sheet 22F may be bent into any geometry suitable for the desired application.

In other examples of step S1, the curved glass substrate 22 is formed as a curved substrate at the outset, as opposed to producing and subsequently bending the flat glass sheet 22F. The curved glass substrate 22 may be produced using any suitable curved glass manufacturing process including, but not limited to, glass blow molding. Similar to the flat glass sheet 22F described above, in this example, where the curved glass substrate 22 is formed at the outset, the curved glass substrate 22 may be comprised of any suitable glass composition including, but not limited to, soda-lime glass, aluminosilicate glass, borosilicate glass, boro-aluminosilicate glass, and the like.

In some examples, the glass assembly 20 is formed as a laminated glass assembly 20. In these examples, the laminated glass assembly 20 includes the curved glass substrate 22 (also referred to as "the first curved glass substrate 22") having the outer surface (P1) and the opposing inner surface (P2), a second curved glass substrate 24 having an inner surface (P3) and an opposing outer surface (P4), and a polymeric interlayer 28 disposed between the P2 surface and the P3 surface (described in further detail below). Accordingly, in the context of laminated glass assemblies 20, step S1 of the method 100 may further include forming a second glass substrate 24 that is curved. It should be appreciated that the second curved glass substrate 24 may be formed according to any of the processes described above regarding the first curved glass substrate 22. It should also be appreciated that the first curved glass substrate 22 and the second curved glass substrate 24 may be formed together (i.e., bent while disposed adjacent to each other) or separately. Similar to the first curved glass substrate 22, the second curved glass substrate 24 may be comprised of any suitable glass composition including, but not limited to, soda-lime glass, aluminosilicate glass, borosilicate glass, boro-aluminosilicate glass, and the like. The first curved glass substrate 22 and the second curved glass substrate 24 may be comprised of the same or different glass compositions.

Advantageously, during the bending process, the first curved glass substrate 22 and/or the second curved glass substrate 24 may be free of conventional conductive paste including ceramic frit, especially on portions of the glass assembly 20 where minimizing distortion is critical (e.g. the field of view of an optical sensor). Accordingly, the first curved glass substrate 22 and/or the second curved glass substrate 24 absorbs heat more uniformly than substrates including conventional conductive paste, thereby preventing uneven deformation (i.e., optical distortion) of the first curved glass substrate 22 and/or the second curved glass substrate 24. Instead, as described below in the context of step S2 and S3, a conductive ink CI is applied to and cured on a surface of the first curved glass substrate 22 and/or the second curved glass substrate 24 to form the conductive feature 26 after step S1.

In some examples, the first curved glass substrate 22 and/or the second curved glass substrate 24 are transparent. In this context, the term "transparent", also referred to as "substantially transparent", refers to a material that allows 70% or more of light transmission in a predefined visible light range to travel therethrough. Unless otherwise indicated, the predefined visible light range is the segment of the electromagnetic spectrum that the human eye can view. More simply, this range of wavelengths is called visible light. Typically, the human eye can detect wavelengths from about 380 to about 780 nanometers, and thus the predefined visible light range as defined herein refers to wavelengths of light from about 380 to about 780 nanometers unless otherwise indicated. In some examples, the first curved glass substrate 22 and/or the second curved glass substrate 24 include various additives to alter the transmissivity of the curved glass substrate; for example, additives may provide various levels of tint or coloration while still maintaining the first curved glass substrate 22 and/or the second curved glass substrate 24 as "transparent" or "substantially transparent" as described above.

In other examples, the first curved glass substrate 22 and/or the second curved glass substrate 24 are less transparent than described above. For example, where the glass assembly 20 is a privacy glass, the transparency of the glass assembly 20 is substantially reduced, and thus the glass assembly 20 allows less than 70% light transmission in a predefined wavelength range, such as from greater than 0 to 70% light transmission at the predefined wavelength range.

The curved glass substrate 22 has a thickness T1. The thickness T1 of the curved glass substrate 22 may be any suitable thickness for the application. For example, in automotive window applications, the thickness T1 of the curved glass substrate 22 may be from about 0.3 mm to about 4.1 mm. More specifically, the thickness T1 may be about 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm. 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, or 4.1 mm.

Similarly, in the context of the laminated glass assemblies 20, the second curved glass substrate 24 has a thickness T2. The thickness T2 of the second curved glass substrate 24 may be any suitable thickness for the application. For example, in automotive laminate applications, the thickness T2 of the second curved glass substrate 24 may be from about 0.3 mm to about 4.1 mm. More specifically, the thickness T2 may be about 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm. 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, or 4.1 mm. It should be appreciated that the thickness T1 and the thickness T2 can be the same or different. In one example, the first curved glass substrate 22 and the second curved glass substrate 24 have the same thickness (i.e., where T1 is equal to T2) such that the glass assembly 20 is considered a "symmetric" laminate. However, in another example, the first curved glass substrate 22 and the second curved glass substrate 24 have different thicknesses (i.e., where T1 is not equal to T2) such that the glass assembly 20 is considered an "asymmetric" laminate. All combinations of the example T1 and T2 values listed above and all fractional values therebetween are contemplated.

Figure 3A:
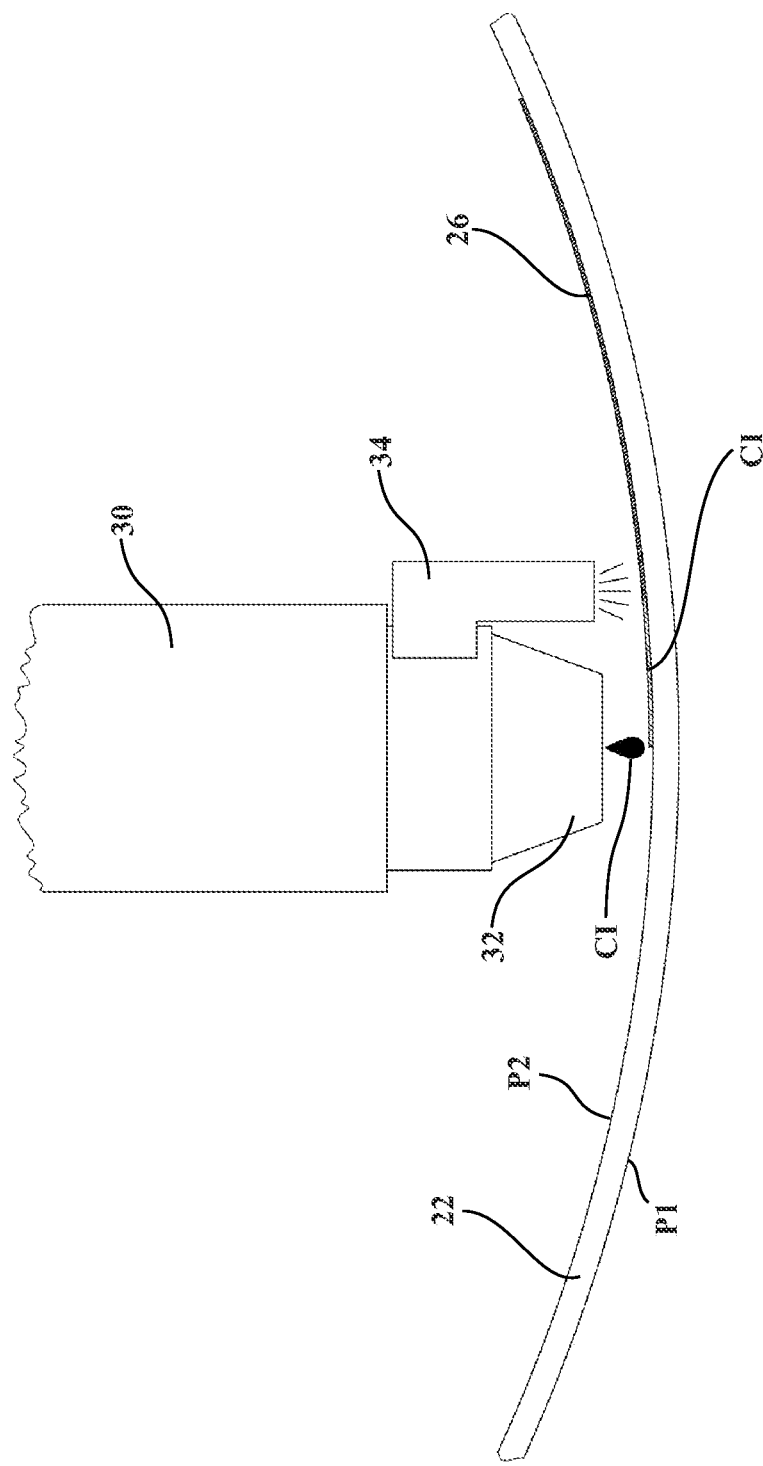
FIG. 3A is a front schematic representation of the steps of digitally-applying a conductive ink onto the curved glass substrate and curing the conductive ink to form a conductive feature.
Figure 3B:
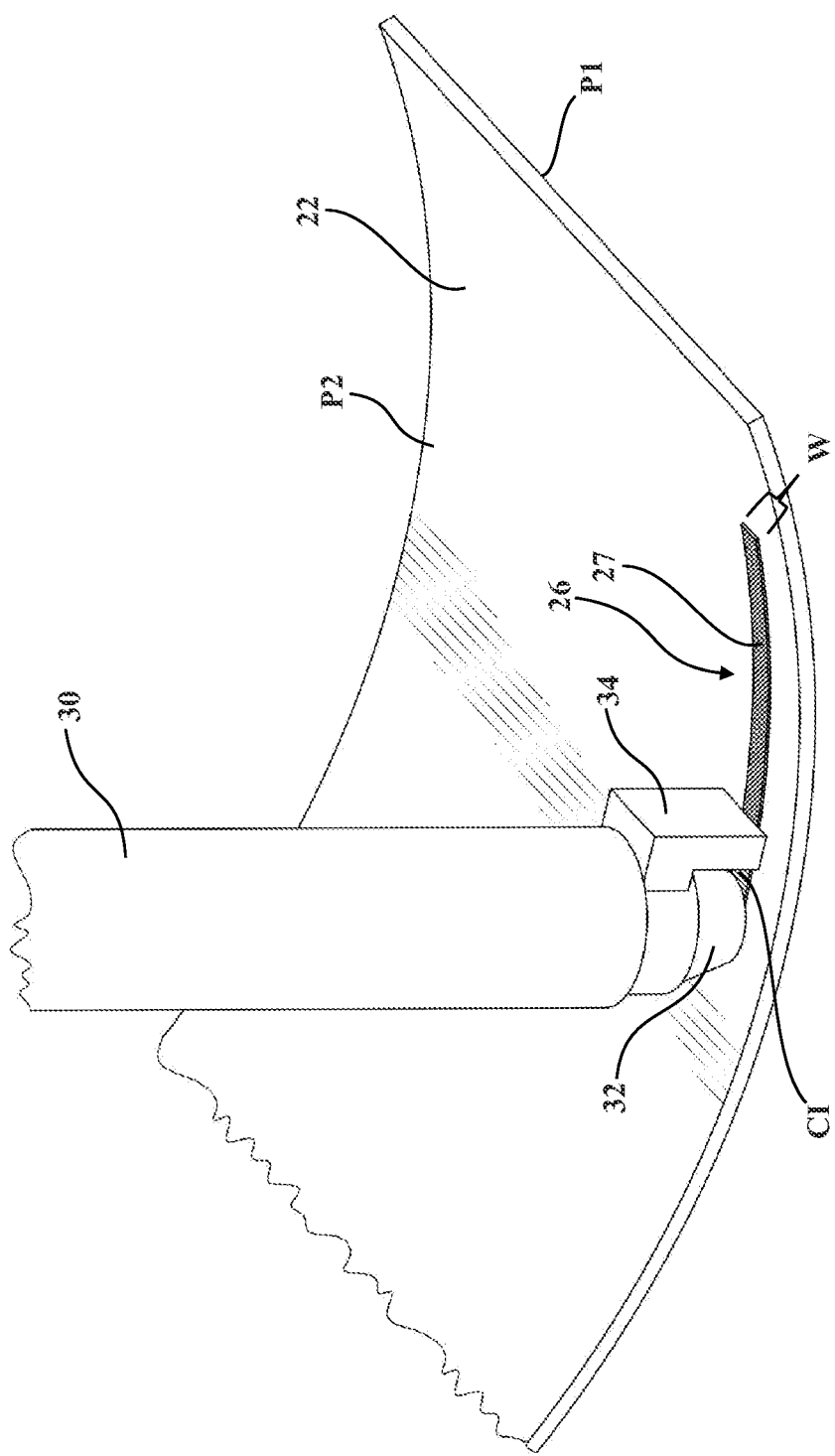
FIG. 3B is a top perspective view of FIG. 3A.

Step S2 of the method 100 includes digitally-applying an conductive ink CI without a mask onto a surface of the curved glass substrate 22. For example, FIGS. 3A-3B illustrate digitally-applying the conductive ink CI onto the P2 surface of the curved glass substrate 22. Notably, the conductive ink CI is typically a liquid when digitally applied in step S2. However, it should be appreciated that the conductive ink CI may also be applied in other forms including, but not limited to, a powder. Additionally, the conductive ink CI may be free of ceramic frit, and, thus, in some examples, the glass assembly 20 may be free of ceramic frit. As described in further detail below, the method 100 includes step S3 of curing the conductive ink CI to solidify the conductive ink CI to form the conductive feature 26.

The term digitally-applying refers to any suitable application process where application of the conductive ink CI is digitally controlled to deposit the conductive ink CI on a substrate in accordance with a digital based image, as opposed to conventional analog printing processes. Example processes for digitally-applying the conductive ink CI include, but are not limited to, inkjet printing, electrohydrodynamic printing, laser printing, and the like. Notably, due to the precise control afforded by digitally-applying the conductive ink CI according to step S2 of the method 100, the conductive ink CI may be deposited at a significantly higher resolution than conventional analog printing processes. For example, the conductive ink CI may be digitally applied onto a surface of the curved glass substrate 22 at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

Accordingly, the higher resolution and precise control of the digital application process of step S2 allows the conductive ink CI to be deposited to form significantly more detailed features and achieve significantly tighter tolerances than conventional analog printing processes. In other words, "more detailed" features may include forming components of the conductive feature 26 that have a smaller geometry (e.g. a lower width W of the at least one conductive line 27) than achievable with conventional analog printing processes. Additionally, using a conventional analog printing process, such as screen printing, the conductive feature may only be able to be repeatably located within a +/−1.5 millimeter tolerance. By contrast, due to the precise control afforded by digitally-applying the conductive ink CI according to step S2 of the method 100, the conductive feature 26 may be more repeatably located in production than conventional analog screen printing processes. For example, using the digital application process of step S2 the conductive feature 26 may be repeatably located within a +/−0.1 millimeter tolerance.

Additionally, it is notable that a mask is not required when digitally-applying the conductive ink CI, as is typically required in conventional analog printing processes. For example, as shown in FIGS. 3A and 3B, when digitally-applying the conductive ink CI according to step S2 of the method 100, the conductive ink CI is deposited directly onto a surface of the curved glass substrate 22 in accordance with a digital based image, eliminating the need for a mask and using less ink than the excess ink required for conventional analog printing employing a mask. Further, due to increased control afforded by digitally-applying the conductive ink CI, it is possible to digitally apply the conductive ink CI as a much thinner layer than possible with conventional analog printing processes. As an example, the conductive ink CI may have a thickness of greater than 0.1 micrometers and less than 15 micrometers on the surface of the curved glass substrate 22. Additionally, it is contemplated that the conductive ink CI may be digitally applied at a variable thickness and cured to form a conductive feature 26 having a variable thickness.

Further, digitally-applying the conductive ink CI according to the method 100 is advantageous over conventional analog printing processes because the digital-based image used to control the digital-application process can be changed quickly and electronically, whereas changing the design for a conventional analog printing process requires producing new physical printing tooling (such as screens for screen printing). Accordingly, digitally-applying the conductive ink CI according to step S2 of the method 100 allows for rapid prototyping of many different arrangements of conductive features 26 by only changing the digital-based image, as opposed to producing new analog printing tooling. This is particularly advantageous for developing conductive features 26 formed as antennas (described below), because digitally-applying the conductive ink CI according to the method 100 eliminates the need to order unique analog printing tools (e.g. screens) for each potential antenna design. Therefore, the development time and costs for antennas (and other conductive features 26) may be substantially reduced.

In the context of laminated glass assemblies 20, step S2 of the method 100 may include digitally-applying the conductive ink CI on at least one of the P1 surface of the first curved glass substrate 22, the P2 surface of the first curved glass substrate 22, the P3 surface of the second curved glass substrate 24, and the P4 surface of the second curved glass substrate 24. It should be appreciated that the conductive ink CI may be digitally-applied to at least one of the P1 surface, the P2 surface, the P3 surface, and the P4 surface according to any of the digital application processes described above. It is contemplated that the conductive ink CI may be applied to any combination of the P1 surface, the P2 surface, the P3 surface, and the P4 surface.

Notably, because the conductive ink CI is solidified onto the substrate on which it is applied, as opposed to being fired, the conductive ink CI does not fuse to the substrate like a conventional conductive paste containing ceramic frit. Advantageously, because the glass assembly 20 formed according to the method 100 is not fired to fuse the conductive ink CI to the first curved glass substrate 22 and/or the second curved glass substrate 24, the strength of the first curved glass substrate 22 and/or the second curved glass substrate 24 is not affected. However, because the conductive ink CI does not fuse to the first curved glass substrate 22 and/or the second curved glass substrate 24, the conductive feature 26 may be more fragile as compared to conventional conductive features formed using conductive paste containing ceramic frit. Accordingly, in some examples, it is advantageous to digitally apply the conductive ink CI on at least one of the P2 surface of the first curved glass substrate 22 and the P3 surface of the second curved glass substrate 24 such that, upon lamination of the glass assembly 20 (described below in the context of step S4), the conductive feature 26 is sandwiched within the glass assembly 20 such that the first curved glass substrate 22 and the second curved glass substrate 24 protect the conductive feature 26 from the surrounding environment.

In one example, step S2 of digitally-applying the conductive ink CI comprises inkjet-printing the conductive ink CI onto the surface of the curved glass substrate 22. Generally, the term "inkjet-printing" refers to a printing process where a digitally controlled printhead propels droplets of ink onto a substrate in accordance with a digital based image. Examples of inkjet printing processes include, but are not limited to, continuous inkjet printing, thermal inkjet printing, piezo inkjet printing, drop-on-demand inkjet printing, and the like. Inkjet-printing the conductive ink CI onto a surface of the first curved glass substrate 22 and/or the second curved glass substrate 24 may be carried out at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

In another example, step S2 of digitally-applying the conductive ink CI comprises electro-hydrodynamically printing the conductive ink CI onto the surface of the curved glass substrate 22. Generally, the term "electrohydrodynamic printing" refers to a printing process where a digitally controlled and electrically charged printhead directs ink through a nozzle and onto a substrate in accordance with a digital based image. In the context of the present disclosure, the nozzle may be the same width as the line width W (described below) of the at least one line 27 of the conductive feature 26. In some examples, the width of the nozzle may be as low as 10 micrometers. Accordingly, in some examples, the line width W of the conductive feature 26 is likewise 10 micrometers. Of course, it should be appreciated that a width of the nozzle may be selected that is wider than 10 micrometers to form conductive features 26 having a wider line width W than 10 micrometers. Additionally, it is contemplated that electro-hydrodynamically printing the conductive ink CI onto a surface of the first curved glass substrate 22 and/or the second curved glass substrate 24 may be carried out at a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

As noted above, there is a challenge with digitally-applying inks onto a curved substrate. Accordingly, in one example, step S2 of digitally-applying the conductive ink CI comprises providing a robotic applicator 30 including a printhead 32. In this example, step S2 of digitally-applying the conductive ink CI further comprises positioning the robotic applicator 30 adjacent to a surface of the first curved glass substrate 22 and/or the second curved glass substrate 24. Additionally, in this example, step S2 of digitally-applying the conductive ink CI comprises digitally-applying the conductive ink CI from the printhead 32 of the robotic applicator 30 without a mask on the surface of the first curved glass substrate 22 and/or the second curved glass substrate 24 as the robotic applicator 30 moves the printhead 32 along the surface of the first curved glass substrate 22 and/or the second curved glass substrate 24. For example, FIGS. 3A and 3B show a schematic representation of a robotic applicator 30 and printhead 32 positioned adjacent to the P2 surface of the first curved glass substrate 22. Accordingly, in the context of the present example, step S2 of digitally-applying the conductive ink CI comprises digitally-applying the conductive ink CI from the printhead 32 of the robotic applicator 30 without a mask on the P2 surface of the first curved glass substrate 22 as the robotic applicator 30 moves the printhead 32 along the P2 surface of the first curved glass substrate 22.

Any suitable robotic applicator 30 that is capable of moving the printhead 32 along the surface of the first curved glass substrate 22 and/or the second curved glass substrate 24 is contemplated. In other words, a robotic applicator 30 that is configured to follow a path that curves with the curvature of the first curved glass substrate 22 and/or the second curved glass substrate 24 as the robotic applicator 30 moves the printhead 32 along the surface of the first curved glass substrate 22 and/or the second curved glass substrate 24 is desired. More specifically, a robotic applicator 30 that is suitable for maintaining a certain distance between the printhead 32 the surface of the first curved glass substrate 22 and/or the second curved glass substrate 24 and maintaining the printhead 32 at an angle that is substantially perpendicular to the surface of the first curved glass substrate 22 and/or the second curved glass substrate 24 is desired. For example, the robotic applicator 30 may be a six-axis robot, a Cartesian robot, or the like that is configured to move the printhead 32 along the surface of the first curved glass substrate 22 and/or the second curved glass substrate 24.

It is contemplated that the conductive ink CI is applied at a width per each pass of the robot applicator 30. The maximum width per pass that the printhead 32 may apply the conductive ink CI is based on the design and settings of the printhead 32. Any suitable printhead 32 capable of digitally-applying the conductive ink CI without a mask is contemplated. In one example, the printhead 32 digitally applies the conductive ink CI at a maximum width of from 30 millimeters to 70 millimeters per pass of the robotic applicator 30. Other printheads 32 are contemplated. It is also contemplated that the robotic applicator 30 may include multiple printheads 32 arranged adjacent to each other to increase the width that the robotic applicator 30 may digitally apply the conductive ink CI per pass.

As described above, the conductive feature 26 of the present disclosure includes the at least one conductive line 27. Advantageously, digitally-applying the conductive ink CI allows the at least one conductive line 27 of the conductive feature 26 to have a significantly lower width W than possible with conventional analog printing processes. For example, based on conventional screen-printing process at 100 dots per inch, the lowest width that an analog printing process can theoretically print a line is about 254 micrometers. Meanwhile, for example, digitally-applying the conductive ink CI at a resolution of 400 dots per inch may print the at least one conductive line 27 of the conductive feature 26 at a width W as low as 64 micrometers. As another example, digitally-applying the conductive ink CI at a resolution of 2500 dots per inch can print the at least one conductive line 27 at a width W as low as 10 micrometers.

Step S3 of the method 100 includes curing the conductive ink CI to form the conductive feature 26 including the at least one conductive line 27 on the surface of the curved glass substrate 22. Notably, after digital application, the conductive ink CI may spread out or disperse on the surface of the curved glass substrate 22 before step S3 of curing the conductive ink CI. For example, the conductive ink CI may be digitally-applied at a resolution of 400 dots per inch in step S2; however, before the curing step S3, the conductive ink CI that was digitally-applied at 400 dots per inch may spread out on the surface of the curved glass substrate 22 such that, upon completion of the curing step S3, the conductive feature 26 has a lower resolution of, for example, 200 dots per inch, than the resolution upon the initial digital application. Additionally, the curing step S3 itself may affect the resolution of the conductive feature 26. For example, the conductive ink CI may expand or contract during the curing step S3, affecting the resolution of the conductive feature 26.

Accordingly, the resolution of the conductive ink CI when digitally applied in step S2 may differ from the resolution of the conductive feature 26 after completion of step S3 of curing the digitally applied conductive ink CI. Thus, upon completion of step S3 of curing the digitally applied conductive ink CI, the conductive feature 26 has a resolution of greater than 200 dots per inch. Particularly, it is contemplated that the conductive feature 26 may have a resolution of greater than 200 dots per inch, greater than 300 dots per inch, greater than 400 dots per inch, greater than 500 dots per inch, greater than 600 dots per inch, greater than 700 dots per inch, greater than 800 dots per inch, greater than 900 dots per inch, greater than 1000 dots per inch, greater than 1100 dots per inch, greater than 1200 dots per inch, greater than 1300 dots per inch, greater than 1400 dots per inch, greater than 1500 dots per inch, greater than 1600 dots per inch, greater than 1700 dots per inch, greater than 1800 dots per inch, greater than 1900 dots per inch, greater than 2000 dots per inch, greater than 2100 dots per inch, greater than 2200 dots per inch, greater than 2300 dots per inch, greater than 2400 dots per inch, greater than 2500 dots per inch, or greater than 2600 dots per inch.

As mentioned above, it is advantageous to cure the conductive ink CI because the conductive ink CI is typically a liquid when digitally applied in step S2. Accordingly, step S3 of curing the conductive ink CI may be initiated shortly after step S2 of digitally-applying the conductive ink CI to prevent running or smudging of the conductive ink CI. For example, the curing step S3 may be initiated within a time period from zero seconds to 5 seconds after step S2 of digitally-applying the conductive ink CI on the surface of the curved glass substrate 22. More specifically, the curing step S3 may be initiated within less than 5 seconds after step S2, less than 4 seconds after step S2, less than 3 seconds after step S2, less than 2 seconds after step S2, or less than 1 second after step S2.

In one example, step S3 of the method 100 includes thermally-curing (sometime referred to as "sintering") the conductive ink CI to form the conductive feature 26. Any suitable thermal curing device is contemplated to thermally cure the conductive ink CI including, but not limited to, an oven, a heat gun, or an IR heater. It should be appreciated that thermally-curing in the context of the present disclosure does not rise to the level of firing the glass assembly 20. As described above, typical firing processes include heating a glass substrate to temperatures in excess of 500 degrees Celsius to fuse the conductive paste including ceramic frit into the glass substrate and/or to bend the glass substrate into a desired shape. On the other hand, thermally-curing in the context of the present disclosure involves subjecting the first curved glass substrate 22 and/or the second curved glass substrate 24 to a temperature sufficient to cure the conductive ink CI (but below the firing temperature of 500 degrees Celsius) on the surface of the first curved glass substrate 22 and/or the second curved glass substrate 24.

In some examples, the curing temperature for curing the conductive ink CI is selected in view of a thermal degradation temperature of the conductive ink CI. More specifically, a curing temperature is selected that is below the thermal degradation temperature of the conductive ink CI to prevent the conductive ink CI from burning off of the curved glass substrate 22 and to minimize optical distortion of the glass assembly 20. For example, the conductive ink CI may comprise a thermally curable organic monomer and conductive particles (e.g. silver nanoparticles or the like) dispersed in the organic monomer. It should be appreciated that in other examples, the organic monomer can instead be an oligomer or a combination of monomers and oligomers. In this example, the conductive ink CI may have a thermal degradation temperature of 210 degrees Celsius. Accordingly, a curing temperature may be selected that is below 210 degrees Celsius, such as 200 degrees Celsius. Notably, the curing temperature for curing the conductive ink CI is significantly lower than the temperatures required for firing conventional conductive pastes. Accordingly, the glass assembly 20 does not experiences a temperature sufficient to soften the glass assembly 20 such that the glass assembly 20 significantly deforms. Accordingly, step S3 of curing the conductive ink CI is unlikely to introduce significant optical distortion into the glass assembly 20.

In another example, the conductive ink CI includes a metal-organic complex that is thermally cured to form the conductive feature 26. The metal-organic complex may comprise a silver-organic compound or any other suitable metal-organic complex that includes an organic component and a conductive metal component, such as a copper-organic compound, or the like. In this example, after the conductive ink CI including the metal-organic complex is digitally applied to the surface of the curved glass substrate 22 in step S2, step S3 comprises exposing the conductive ink CI to a temperature sufficient to volatize the organic component of the metal-organic complex such that only the metal particles (e.g. the silver particles) remain on the surface of the curved glass substrate 22 to form the conductive feature 26. Notably, the temperature sufficient to volatize the organic component of the metal-organic complex may be significantly lower than the temperature required for firing conventional conductive pastes. Accordingly, the glass assembly 20 does not experiences a temperature sufficient to soften the glass assembly 20 such that the glass assembly 20 significantly deforms. Accordingly, step S3 of curing the conductive ink CI is unlikely to introduce significant optical distortion into the glass assembly 20.

In other examples, step S3 of the method 100 includes photo-curing the conductive ink CI with a UV curing device 34. In this example, the conductive ink CI is a photo-curable conductive ink CI. The photo-curable conductive ink CI may include a photoinitiator, an organic monomer, and conductive particles (e.g. silver nanoparticles or the like) dispersed in the organic monomer. It should be appreciated that in other examples, the organic monomer can instead be an oligomer or a combination of monomers and oligomers. The photoinitiator may include any suitable compound that initiates polymerization of the organic monomer in response to exposure to UV light. For example, the photoinitiator may be a compound that creates a reactive species (e.g. free radicals, cations, or anions) when exposed to UV light that initiates polymerization of the organic monomer and/or oligomer. Accordingly, in the present example, step S3 of curing the conductive ink CI to form the conductive feature 26 includes exposing the conductive ink CI to the UV curing device 34 to activate the photoinitiator to initiate polymerization of the organic monomer to cure the conductive ink CI. In this example, step S3 of curing the conductive ink CI does not involve any outside application of heat, thus, this example of step S3 is less likely to introduce significant optical distortion into the glass assembly 20.

In one example, the UV curing device 34 is a UV light emitting diode that emits UV light. For example, the UV curing device 34 may emit UV light having a wavelength of 315 nanometers to 400 nanometers (generally known as the UV-A spectrum). The UV light emitting diode may emit UV light having a narrower spectrum, such as emitting UV light that substantially has a wavelength of 385 nanometers. Any wavelength within the UV spectrum is contemplated.

FIG. 3A shows one example of step S3. In the example of FIG. 3A, the robotic applicator 30 further includes the UV curing device 34. Although not required, the UV curing device 34 may be arranged adjacent to the printhead 32 such that the UV curing device 34 follows the same path as the printhead 32 as the robotic applicator 30 moves the printhead 32 along the surface of the curved glass substrate 22. Accordingly, in the present example, step S3 of curing the conductive ink CI to form the conductive feature 26 comprises activating the UV curing device 34 of the robotic applicator 30 to initiate photo-curing of the digitally applied conductive ink CI as the robotic applicator 30 moves along the surface of the curved glass substrate 22. In doing so, step S3 of curing the conductive ink CI occurs shortly after step S2 of digitally-applying the conductive ink CI to prevent running or smudging of the conductive ink CI.

In some examples, step S3 of the method 100 may further include subjecting the glass assembly 20 to elevated humidity and/or pressure during one of the curing processes contemplated above.

In the context of laminated glass assemblies 20, step S3 of the method 100 includes curing the conductive ink CI to form the conductive feature 26 on at least one of the P1 surface, the P2 surface, the P3 surface, and the P4 surface. It should be appreciated that curing the conductive ink CI to form the conductive feature 26 on at least one of the P1 surface, the P2 surface, the P3 surface, and the P4 surface may be carried out according to any of the curing processes described above.

Figure 4A:
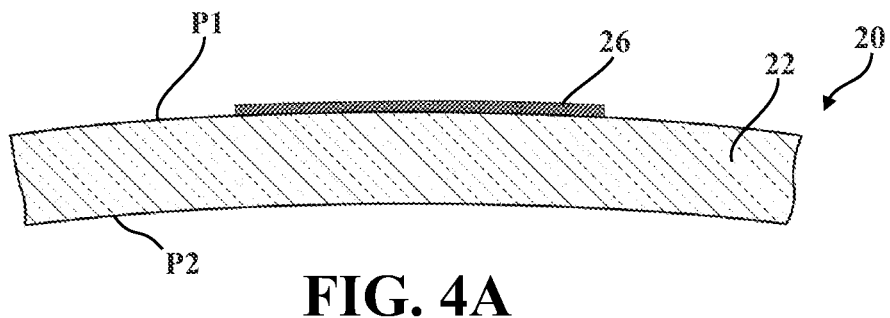
FIGS. 4A-4C are cross-sectional schematic representations of examples of a glass assembly including a conductive feature.
Figure 4B:
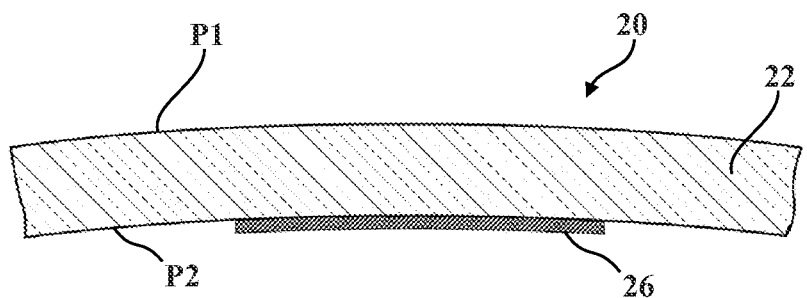
Figure 4C:
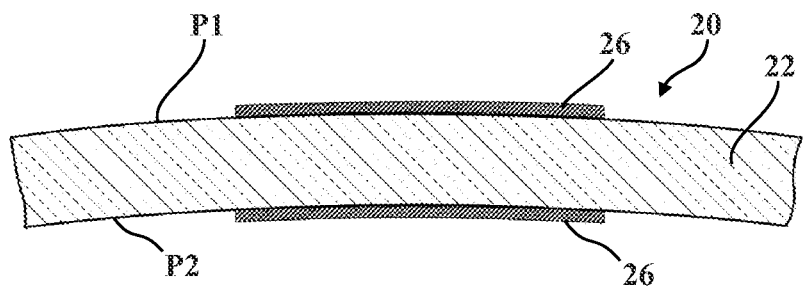

FIGS. 4A-4C show cross-sectional schematic representations of various examples of glass assemblies 20 formed according to the method 100. FIG. 4A shows one glass assembly 20 including the curved glass substrate 22 with the conductive feature 26 formed on the P1 surface of the curved glass substrate 22. FIG. 4B shows another glass assembly 20 including the curved glass substrate 22 with the conductive feature 26 formed on the P2 surface of the curved glass substrate 22. FIG. 4C shows yet another glass assembly 20 including the curved glass substrate 22 with one conductive feature 26 formed on the P1 surface of the curved glass substrate 22, and another conductive feature 26 formed on the P2 surface of the curved glass substrate 22.

Figure 5:
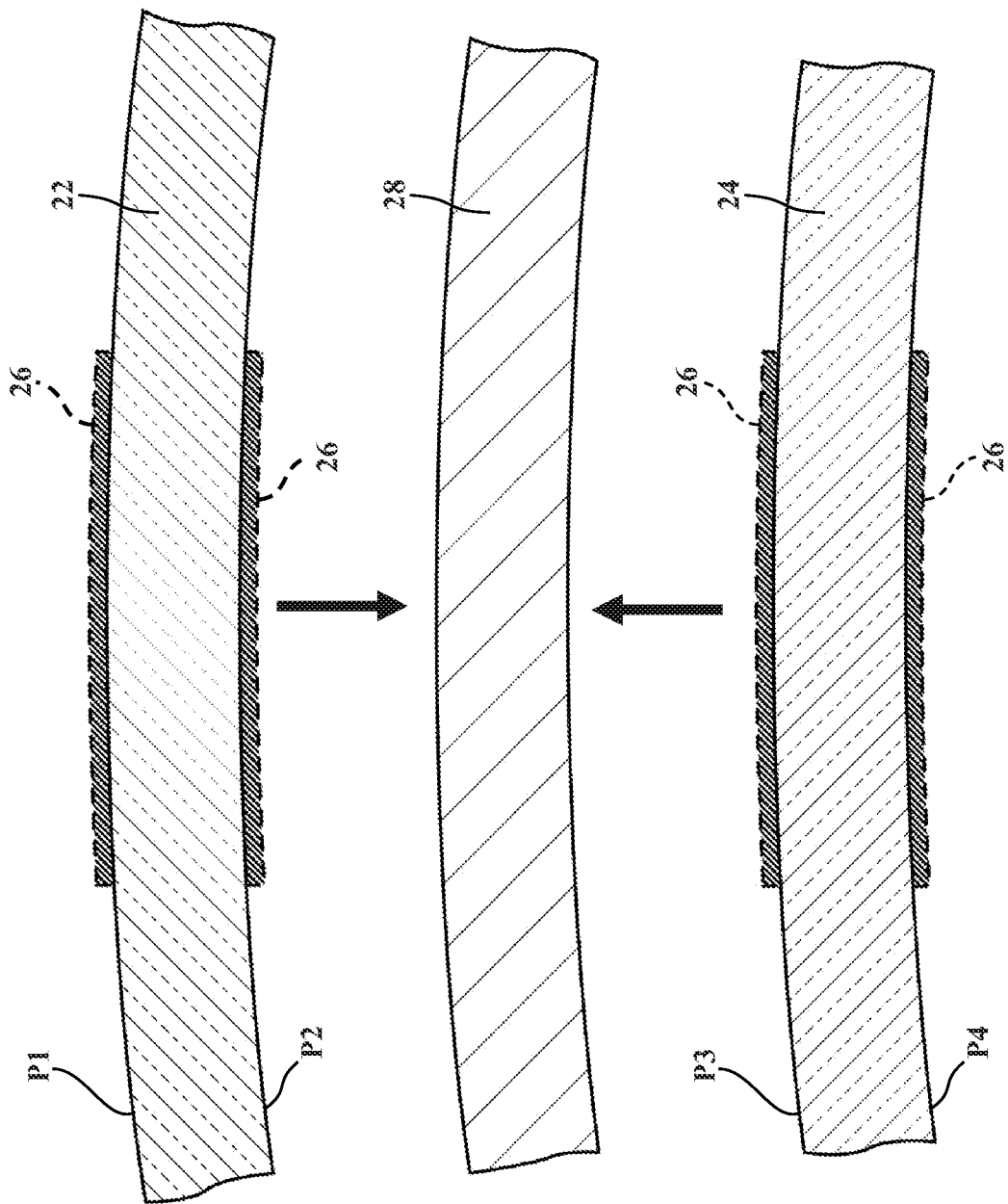
FIG. 5 is a cross-sectional schematic representation of a step of disposing a polymeric interlayer between a first curved glass substrate and a second curved glass substrate.

Referring to FIG. 5, where the glass assembly 20 is a laminated glass assembly 20, the method 100 further includes a step S4 of disposing a polymeric interlayer 28 between the P2 surface of the first curved glass substrate 22 and the P3 surface of the second curved glass substrate 24. The polymeric interlayer 28 bonds the first curved glass substrate 22 and the second curved glass substrate 24 such that the polymeric interlayer 28 retains the first curved glass substrate 22 and/or the second curved glass substrate 24 in the event of impact or breakage of the laminated glass assembly 20. The polymeric interlayer 28 includes a polymer or thermoplastic resin, such as polyvinyl butyral (PVB), ethylene-vinyl acetate (EVA), thermoplastic polyurethane (TPU), and the like. Other suitable materials for implementing the polymeric interlayer 28 may be utilized that provide the requisite performance characteristics regarding optical haze, adhesion to glass, and structural rigidity. Similar to the first curved glass substrate 22 and the second curved glass substrate 24, the polymeric interlayer 28 is also substantially transparent or otherwise transparent to light. Accordingly, the laminated glass assembly 20 that includes the polymeric interlayer 28 between the first curved glass substrate 22 and the second curved glass substrate 24 is also substantially transparent or otherwise transparent to light.

An example lamination process comprises the steps of stacking and aligning the first curved glass substrate 22, the second curved glass substrate 24, the polymeric interlayer 28, and any other interlayers that may be a part of the laminated glass assembly 20. After stacking and aligning these components, the glass assembly 20 may be subject to a de-airing process where the glass assembly 20 is subject to a vacuum to remove any air that may be trapped between the first curved glass substrate 22, the second curved glass substrate 24, the polymeric interlayer 28, and any other interlayers. After the de-airing process, the glass assembly 20 may be subject to an autoclave process where the glass assembly 20 is subject to an elevated temperature and/or an elevated pressure to bond the polymeric interlayer 28 to each of the layers adjacent to the polymeric interlayer 28 to form the laminated glass assembly 20. Notably, the temperature within the autoclave should be below the thermal degradation temperature of the conductive ink CI to prevent damage to the conductive ink CI.

In the example shown in FIG. 6A, the laminated glass assembly 20 includes the first curved glass substrate 22, the conductive feature 26 formed on the P1 surface of the first curved glass substrate 22, the second curved glass substrate 24, and the polymeric interlayer 28 disposed between the P2 surface and the P3 surface. In the example shown in FIG. 6B, the laminated glass assembly 20 includes the first curved glass substrate 22, the conductive feature 26 formed on the P2 surface of the first curved glass substrate 22, the second curved glass substrate 24, and the polymeric interlayer 28 disposed between the P2 surface and the P3 surface. In the example shown in FIG. 6C, the laminated glass assembly 20 includes the first curved glass substrate 22, the second curved glass substrate 24, the conductive feature 26 formed on the P3 surface of the second curved glass substrate 24, and the polymeric interlayer 28 disposed between the P2 surface and the P3 surface. In the example shown in FIG. 6D, the laminated glass assembly 20 includes the first curved glass substrate 22, the second curved glass substrate 24, the conductive feature 26 formed on the P4 surface of the second curved glass substrate 24, and the polymeric interlayer 28 disposed between the P2 surface and the P3 surface. Although FIGS. 6A-6D show the conductive feature 26 formed on the P1 surface, the P2 surface, the P3 surface, and the P4 surface individually, it is contemplated that a plurality of conductive features 26 may be formed on any combination of the P1 surface, the P2 surface, the P3 surface, and the P4 surface.

Referring to FIGS. 7-10B, in some examples, the conductive feature 26 including the at least one conductive line 27 defines a heating element 36 configured to be energized to heat (i.e., defrost and/or defog) at least a portion of the glass assembly 20. The heating element 36 may be formed according to the method 100 to have any suitable geometry that forms a circuit that is configured to be energized to heat (i.e., defrost and/or defog) at least a portion of the glass assembly 20. Suitable geometries for the heating element 36 include, but are not limited to, a meandering geometry, a grid geometry, a fan geometry, and a spiral geometry. The at least one conductive line 27 has a line width W. Any suitable line width W for defining a heating element 36 is contemplated. It should be appreciated that the line width W of the at least one conductive line 27, as well as the conductive particle load of the conductive ink CI, may be adjusted to achieve a desired resistivity of the heating element 36. For example, the heating element 36 may have a resistivity of less than 10 microohms centimeter. Preferably, the heating element 60 may have a resistivity of less than 5 microohms centimeter.

Figures 8A, 8B:
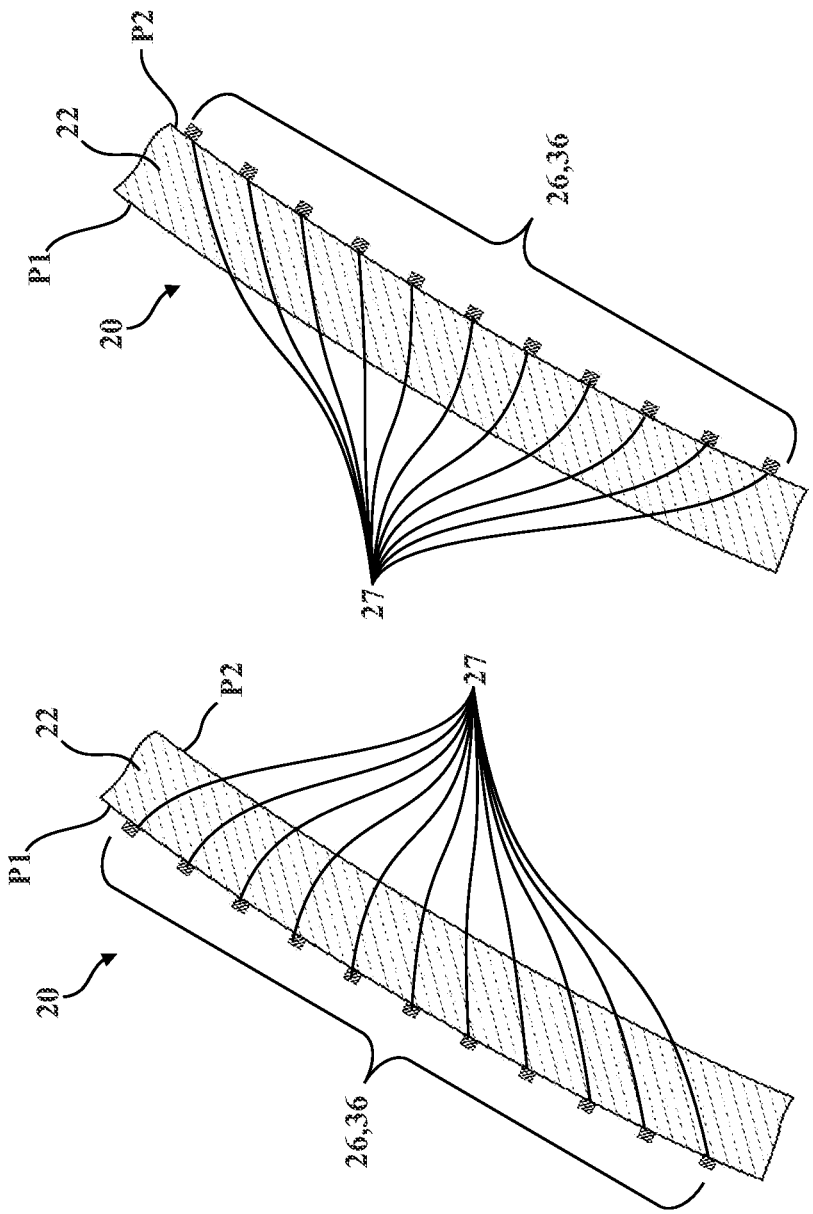
FIGS. 8A-8B are cross-sectional schematic representations of examples of the glass assembly of FIG. 7 taken along line 8-8.

FIG. 7 shows one example of a vehicle 18 including a rear glass assembly 20. The rear glass assembly 20 includes the conductive feature 26 including the at least one conductive line 27 that defines the heating element 36 having a meandering geometry. In this example, the heating element 36 of FIG. 7 is defined by the conductive line 27. The conductive line 27 veers back and forth across the surface of the curved glass substrate 22 to form a circuit that is configured to be energized to heat (i.e., defrost and/or defog) at least a portion of the glass assembly 20. FIGS. 8A-8B show various examples of cross-sectional schematic representations of the glass assembly 20 of FIG. 7. More specifically, FIG. 8A shows the conductive feature 26 including the conductive line 27 formed on the P1 surface of the curved glass substrate 22. FIG. 8B shows the conductive feature 26 including the conductive line 27 formed on the P2 surface of the curved glass substrate 22. It should also be appreciated that in some examples, the conductive feature 26 including the at least one conductive line 27 may be formed on both the P1 surface and the P2 surface of the curved glass substrate 22.

Figure 10A:
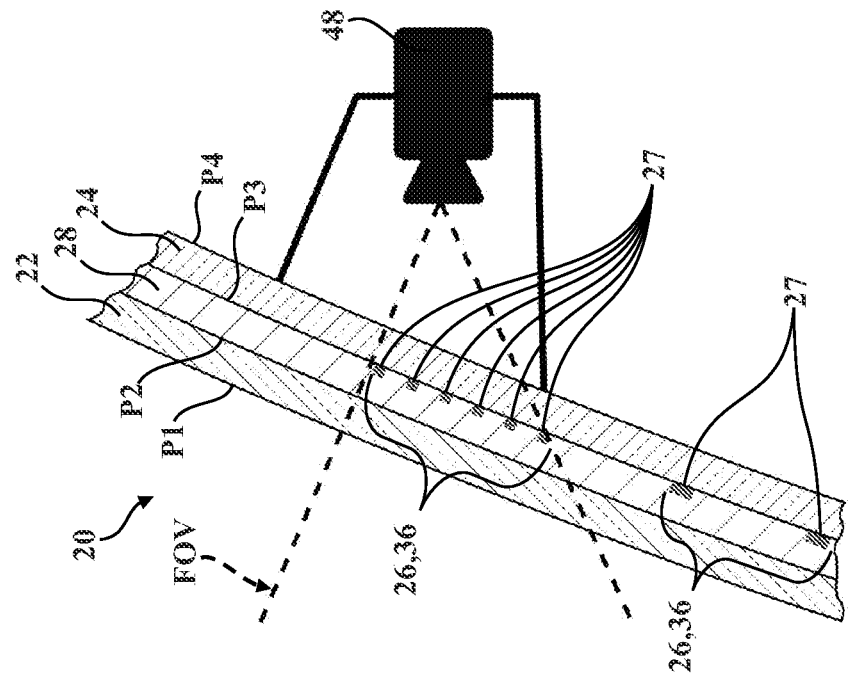
FIGS. 10A-10B are cross-sectional schematic representations of examples of the glass assembly of FIG. 9 taken along line 10-10.
Figure 10B:
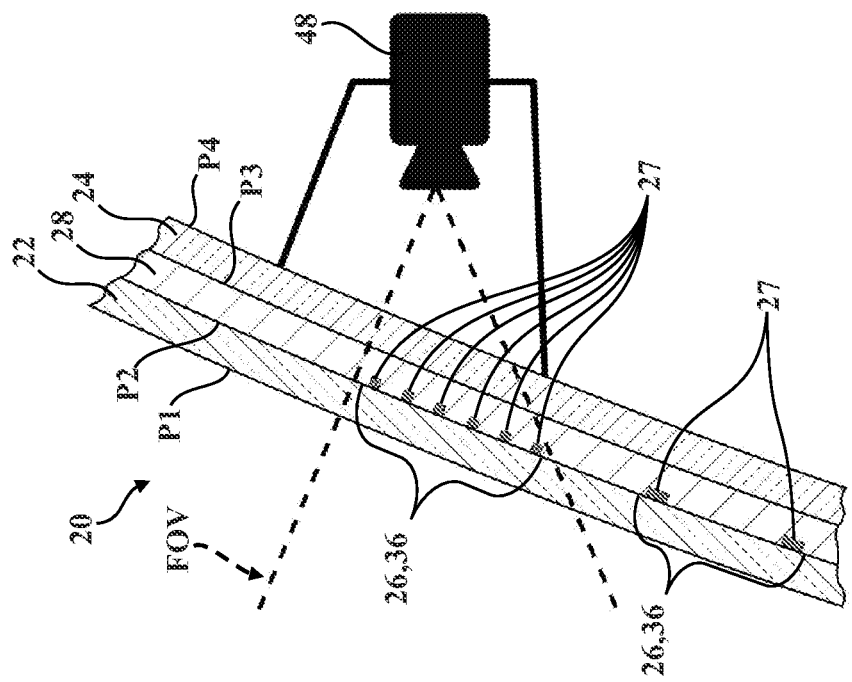

FIG. 9 shows another example of a vehicle 18 including a front glass assembly 20. The front glass assembly 20 includes the conductive feature 26 including the at least one conductive line 27 that defines the heating element 36 having a grid geometry. In this example, the heating element 36 is defined by of a plurality of conductive lines 27 that intersect to form a circuit that is configured to be energized to heat (i.e., defrost and/or defog) at least a portion of the glass assembly 20. FIGS. 10A and 10B show various examples of cross-sectional schematic representations of the glass assembly 20 of FIG. 9. Notably, in this example, the front glass assembly 20 is a laminated glass assembly 20. Accordingly, the glass assembly 20 includes the first curved glass substrate 22, the second curved glass substrate 24, and the polymeric interlayer 28.

FIGS. 10A-10B show cross-sectional schematic representations of examples of the glass assembly 20 of FIG. 9. As described above, in some examples it is advantageous to form the conductive feature 26 on at least one of the P2 surface and the P3 surface to protect the conductive feature 26 from the surrounding environment. Accordingly, in the example of FIG. 10A, the conductive feature 26 is formed on the P2 surface of the first curved glass substrate 22. In the example of FIG. 10B, the conductive feature 26 is formed on the P3 surface of the second curved glass substrate 24. Although FIGS. 10A and 10B show the conductive feature 26 formed on the P2 surface and the P3 surface, it should be appreciated that the conductive feature 26 may also be formed on the P1 surface and/or the P4 surface of the glass assembly 20.

With continued reference to FIGS. 9-10B, in some examples, glass assembly 20 may further include an optical sensor 48 mounted to the glass assembly 20. The optical sensor 48 may be a component of a semi-autonomous or autonomous driving system. It should be appreciated that the optical sensor 48 may be mounted to the glass assembly 20 in any suitable manner. For example, FIGS. 10A-10B also show examples of the glass assembly 20 including the optical sensor 48 mounted to the glass assembly 20 on the P4 surface. The optical sensor 48 has a field of view FOV (i.e., a limited angular range that the optical sensor 48 can "see" while stationary).

Notably, frost or other condensation may obscure the field of view FOV and, therefore, hinder the performance of the optical sensor 48. Accordingly, in some examples, the glass assembly 20 includes another conductive feature 26 including the at least one conductive line 27 that defines the heating element 36 that is aligned with the field of view FOV of the optical sensor 48 to heat (i.e., defrost and/or defog) at least a portion of the glass assembly 20 corresponding to the field of view FOV of the optical sensor 48. As described above, conductive features formed using conventional conductive pastes tend to exhibit significant optical distortion of the glass assembly, which is particularly detrimental to the performance of optical sensors when the distortion is within the field of view FOV of the optical sensor. In the present disclosure, however, the conductive feature 26 (e.g. heating element 36) is not subject to firing after printing, thereby substantially reducing the optical distortion of the glass assembly 20. Thus, advantageously, the optical distortion exhibited by a glass assembly 20 formed according to the method 100 is low enough to meet specifications required for optimal performance of optical sensors 48, such as a camera or a LIDAR sensor, as well as optical projecting devices, such as a heads-up-display. For example, a glass assembly 20 formed according to the method 100 may exhibit an optical distortion of less than 100 millidiopters within the field of view FOV of the optical sensor.

In the context of heating elements 36 that are aligned with the field of view FOV of the optical sensor 48, it is desirable that the at least one conductive line 27 defining the heating element 36 does not perceivably obscure the optical sensor 48 such that the performance of the optical sensor 48 is affected. Particularly, where the heating elements 36 are aligned with the field of view FOV of the optical sensor 48, it is advantageous to form the lines 27 of the conductive feature 26 to have a line width W that is small enough to ensure that the lines 27 do not cause a "blind spot" in the vision of the optical sensor 48, and to minimize diffraction of light entering the optical sensor 48 caused by the lines 27. As described above, the higher resolution of the digital application process of step S2 enables the at least one conductive line 27 of the conductive feature 26 to be formed with a significantly smaller line width W than possible with conventional analog printing processes. Accordingly, in one example, where the optical sensor 48 is a camera, the at least one conductive line 27 of the conductive feature 26 may be formed to have a line width W of less than 100 micrometers. In another example, where the optical sensor is a LIDAR sensor, the at least one conductive line 27 of the conductive feature 26 may be formed to have a smaller line width W of less than 65 micrometers.

Referring again to FIG. 9, another example of a conductive feature 26 including at least one line 27 formed according to the method 100 is a bus bar 37. The bus bar 37 may be configured to transfer energy to another conductive feature 26 (such as heating element 36) of the glass assembly 20. For example, a glass assembly 20 may be formed according to the method 100 to include a heating element 36. To supply power to the heating element 36, a bus bar 37 may be formed according to the method 100 to be in electrical communication with the heating element 36 to supply the heating element 36 with power. Any suitable geometry (e.g. line width W) and location of the bus bar 37 relative to the other conductive feature 26 is contemplated. Additionally, bus bars 37 for supplying other conductive features 26 beyond heating elements 36 with power are contemplated.

Referring to FIGS. 11-14B, in other examples, the conductive feature 26 including the at least one conductive line 27 defines an antenna 50 configured to transmit and/or receive radio signals. In some examples, the antenna 50 may be configured to transmit and/or receive radio signals having a frequency of from 540 kilohertz to 6 gigahertz. Accordingly, the antenna 50 may be configured to transmit and/or receive radio signals within any of a number of standard frequencies including, but not limited to, amplitude modulation (AM), frequency modulation (FM), Digital Audio Broadcasting (DAB), Remote Keyless Entry (RKE), Digital television (DTV), Global Positioning System (GPS), 2G cellular, 3G cellular, 4G cellular, and some 5G cellular frequencies (more specifically, low-band and mid-band 5G cellular frequencies that are less than 6 gigahertz).

The antenna 50 may be formed according to the method 100 to have any suitable structure for transmitting and/or receiving radio signals having a frequency of from 540 kilohertz to 6 gigahertz. Examples of suitable antenna structures for the antenna 50 include, but are not limited to, various configurations of planar antennas, such as planar monopole antennas, planar dipole antennas, patch antennas, slot antennas, vivaldi antennas, planar conical antennas, planar bulbous antennas, planar horn antennas, and the like. It should be appreciated that the at least one conductive line 27 of the conductive feature may define a portion or an entirety of the antenna 50. For example, the at least one conductive line 27 may define one or more of a feed line FL, a radiating element RE, and a ground plane GP. In examples where a portion of the antenna 50 has a non-linear structure (e.g. a patch antenna), a plurality of conductive lines 27 may be digitally applied and cured adjacent to each other to define the portion of the antenna 50 having a non-linear structure.

Forming the antenna 50 according to the method 100 is advantageous in a variety of aspects. In one aspect, as described above, the higher resolution of the digital application process of step S2 allows the conductive ink CI to be deposited with significantly tighter tolerances than conventional analog printing processes. For example, using a conventional analog printing process, such as screen printing, the conductive feature may only be able to be repeatably located within a +/−1.5 millimeter tolerance. However, due to the precise control of the digital application process of step S2, the conductive feature 26 including the at least one conductive line 27 defining an antenna 50 may be able to be repeatably located within less than a +/−0.1 millimeter tolerance.

In another aspect, as also described above, the higher resolution of the digital application process of step S2 allows the conductive ink CI to be deposited to form significantly more detailed features than conventional analog printing processes. For example, using a conventional analog screen printing process, such as screen printing, the conductive feature may only be able to be deposited at a width W of 113 micrometers. However, due to the increased accuracy and precision of the digital application process of step S2, antennas 50 formed according to the method 100 may have significantly more detailed features than antennas formed using conventional analog printing processes. For example, the conductive feature 26 including the at least one conductive line 27 defining an antenna 50 may be formed to have a width W of less than 100 micrometers, or even as low as 10 micrometers. Additionally, due to the more detailed features, the antennas 50 of the present disclosure may be capable of transmitting and/or receiving radio signals at higher frequency and/or having a higher bandwidth than antennas formed using conventional analog printing processes. As an example, the antennas 50 of the present disclosure may include small "tuning stub" features that extend from the antenna 50 to improve the bandwidth of the antenna 50.

FIG. 11 shows one example of a vehicle 18 including a rear glass assembly 20 that has been formed according to the method 100 to have the conductive feature 26 including at least one conductive line 27 defining the antenna 50 configured to transmit and/or receive radio signals. In this example, the antenna 50 includes a feed line FL coupled to a radiating element RE, and a ground plane GP arranged adjacent to the feed line FL and the radiating element RE. Although FIG. 11 shows one potential structure of the antenna 50, it should be appreciated that any suitable antenna structure is contemplated. FIGS. 12A-12C show various examples of cross-sectional schematic representations of the glass assembly 20 of FIG. 11. In the example of FIG. 12A, the antenna 50 is formed on the P1 surface of the curved glass substrate 22 such that the feed line FL, radiating element RE and the ground plane GP are all arranged on the P1 surface. In the example of FIG. 12B, the antenna 50 is formed on the P2 surface of the curved glass substrate 22 such that the feed line FL, the radiating element RE and the ground plane GP are all arranged on the P2 surface. In other examples, the antenna 50 may be formed as a multi-planar antenna. For example, referring to FIG. 12C, the glass assembly 20 may include a first portion 52 of the antenna 50 (in this example, the feed line FL and the radiating element RE) on the P1 surface of the curved glass substrate 22 and a second portion 54 of the antenna (in this example, the ground plane GP) on the P2 surface of the curved glass substrate 22. Any suitable multi-planar antenna configuration is contemplated.

Where the glass assembly 20 is formed as a laminated glass assembly 20, the conductive feature 26 including the at least one conductive line 27 defining the antenna 50 may include the first antenna portion 52 formed on one of the P1 surface, the P2 surface, the P3 surface, and the P4 surface and the second antenna portion 54 formed on another of the P1 surface, the P2 surface, the P3 surface, and the P4 surface. Advantageously, the tighter tolerances afforded by digitally-applying the conductive ink CI according to step S2 of the method 100 enable improved alignment of the first antenna portion 52 and the second antenna portion 54, thereby improving the electrical communication between the first antenna portion 52 and the second antenna portion 54 and, thus, improving the performance of the antenna 50.

Figures 14A, 14B:
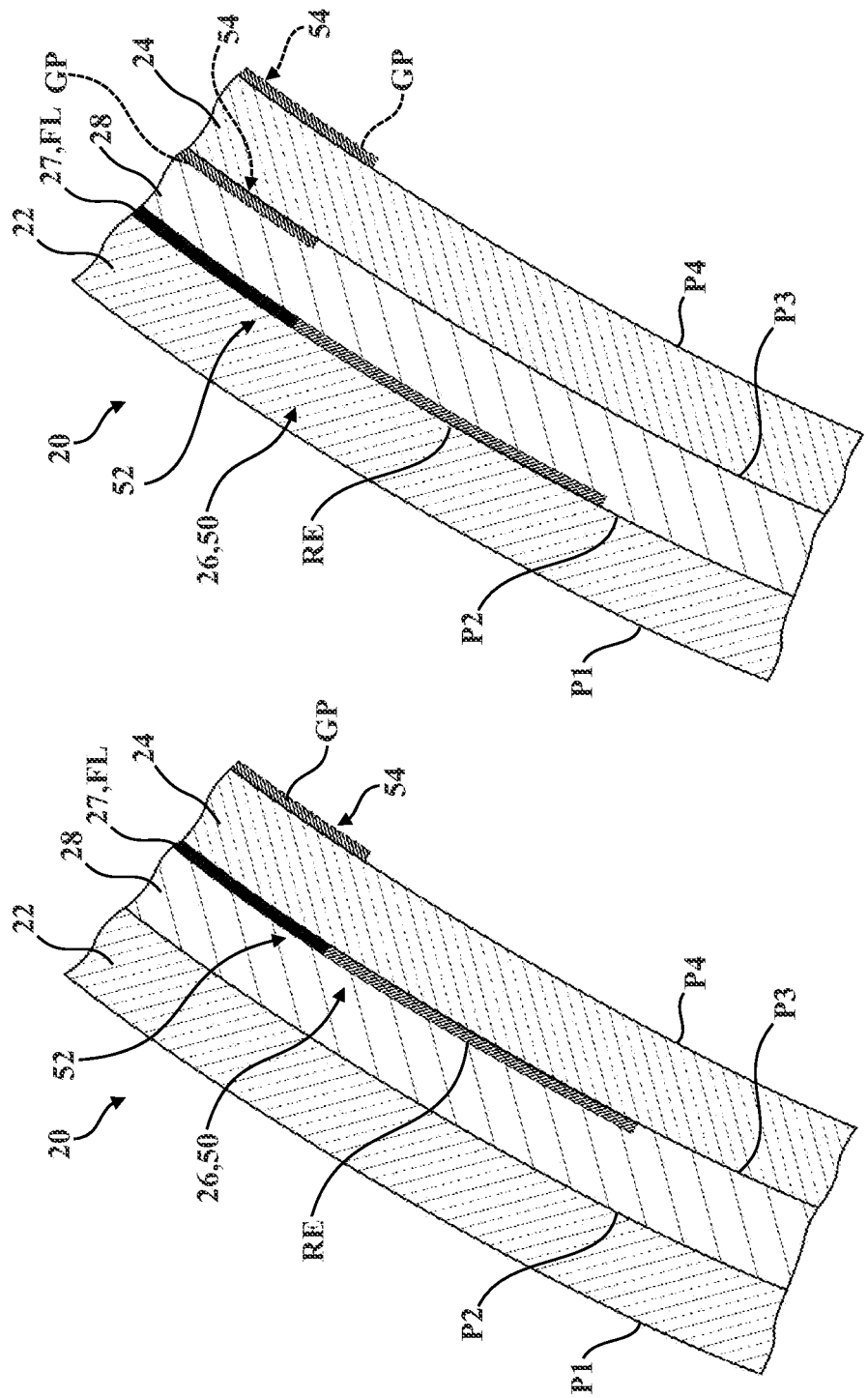
FIGS. 14A-14B are cross-sectional schematic representations of examples of the glass assembly of FIG. 13 taken along line 14-14.

Additionally, as described above, in the context of laminated glass assemblies 20, it is advantageous to digitally apply the conductive ink CI on at least one of the P2 surface of the first curved glass substrate 22 and the P3 surface of the second curved glass substrate 24 such that, upon lamination of the glass assembly 20, the conductive feature 26 is sandwiched within the glass assembly 20. Accordingly, in some examples, the first antenna portion 52 is formed on one of the P2 surface and the P3 surface, and the second antenna portion 54 is formed on one of the P1 surface, the P2 surface, the P3 surface, and the P4 surface such that at least one of the first antenna portion 52 and the second antenna portion 54 are sandwiched within the glass assembly 20. In some examples, the second antenna portion 54 is formed on a different surface than the first antenna portion 52. However, it is contemplated that in other examples, the second antenna portion 54 is formed on the same surface as the first antenna portion 52. FIGS. 12C and 14A-14B illustrate examples of the second antenna portion 54 formed on a different surface than the first antenna portion 52.

FIG. 13 illustrates a vehicle 18 including a front glass assembly 20 formed according to the method 100 to have the conductive feature 26 including the at least one conductive line 27 defining an antenna 50 configured to transmit and/or receive radio signals. Similar to the example of FIG. 11, the antenna 50 of FIG. 13 includes a feed line FL coupled to a radiating element RE, and a ground plane GP arranged adjacent to the feed line FL and the radiating element RE. FIGS. 14A-14B show various examples of cross-sectional schematic representations of the glass assembly 20 of FIG. 13. In the example of FIG. 14A, the glass assembly 20 includes a first portion 52 of the antenna 50 (in this example, the feed line FL and the radiating element RE) on the P3 surface of the second curved glass substrate 24 and a second portion 54 of the antenna (in this example, the ground plane GP) on the P4 surface of the second curved glass substrate 24. In the example of FIG. 14B, the glass assembly 20 includes a first portion 52 of the antenna 50 (in this example, the feed line FL and the radiating element RE) on the P2 surface of the first curved glass substrate 22 and a second portion 54 of the antenna (in this example, the ground plane GP) on one of the P3 surface and the P4 surface of the second curved glass substrate 24 (these alternative arrangements of the second antenna portion 54 are illustrated with phantom outlines). Although FIGS. 14A and 14B show example arrangements where the ground plane GP is arranged closer to the interior of the vehicle 18, it should be appreciated that the first antenna portion 52 and the second antenna portion 54 may be independently formed on any of the P1 surface, the P2 surface, the P3 surface, and the P4 surface to form a suitable antenna 50.

Several embodiments have been described in the foregoing description. However, the embodiments described herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular. It will be further appreciated that the terms "include," "includes," and "including" have the same meaning as the terms "comprise," "comprises," and "comprising."

What is claimed is:

1. A method of manufacturing a glass assembly to have a conductive feature including at least one conductive line, said method comprising:
forming a glass substrate that is curved;
digitally-applying a conductive ink without a mask onto a surface of the curved glass substrate; and
curing the conductive ink to form the conductive feature on the surface of the curved glass substrate, with the conductive feature having a resolution of greater than 200 dots per inch.

2. The method of claim 1, wherein the at least one conductive line defines a heating element configured to be energized to heat at least a portion of the glass assembly.

3. The method of claim 2, wherein the heating element is aligned with a field of view of an optical sensor mounted to the glass assembly to heat at least a portion of the glass assembly corresponding to the field of view of the optical sensor.

4. The method of claim 3, wherein the optical sensor is a camera, and the at least one conductive line has a line width of less than 100 micrometers.

5. The method of claim 3, wherein the optical sensor is a LIDAR sensor, and the at least one conductive line has a line width of less than 65 micrometers.

6. The method of claim 3, wherein the glass assembly exhibits an optical distortion of less than 100 millidiopters within the field of view of the optical sensor.

7. The method of claim 1, wherein the at least one conductive line defines an antenna configured to transmit and/or receive radio signals having a frequency of from 540 kilohertz to 6 gigahertz.

8. The method of claim 7, wherein the at least one conductive line has a line width of less than 50 micrometers.

9. The method of claim 1, wherein the curved glass substrate comprises a first glass substrate that is curved, with the first glass substrate having an outer surface (P1) and an opposing inner surface (P2), and the method further comprises forming a second glass substrate that is curved, with the second glass substrate having an inner surface (P3) and an opposing outer surface (P4), wherein said step of digitally-applying the conductive ink comprises digitally-applying the conductive ink on at least one of the P2 surface and the P3 surface.

10. The method of claim 9, further comprising disposing a polymeric interlayer between the P2 surface of the first glass substrate and the P3 surface of the second glass substrate.

11. The method of claim 9, wherein the at least one conductive line defines an antenna configured to transmit and/or receive radio signals, wherein the antenna comprises:
a first antenna portion on one of the P2 surface and the P3 surface; and
a second antenna portion on one of the P1 surface, the P2 surface, the P3 surface, and the P4 surface, provided the second antenna portion is on a different surface than the first antenna portion.

12. The method of claim 1, wherein the conductive feature has a resolution of greater than 400 dots per inch.

13. The method of claim 1, wherein said step of digitally-applying the conductive ink further comprises inkjet-printing the conductive ink.

14. The method of claim 1, wherein the conductive ink has a thermal degradation temperature, and wherein said step of curing the conductive ink to form the conductive feature occurs below the thermal degradation temperature of the conductive ink.

15. The method of claim 1, wherein the conductive ink includes a metal-organic complex, and the conductive ink is thermally-cured to form the conductive feature.

16. The method of claim 1, wherein said step of curing the conductive ink to form the conductive feature comprises photo-curing the conductive ink with a UV curing device.

17. The method of claim 1, wherein said step of curing the conductive ink is initiated within 5 seconds after said step of digitally-applying the conductive ink.

18. The method of claim 1, further comprising providing a robotic applicator including a printhead and a curing device, and positioning the robotic applicator adjacent to the surface of the curved glass substrate;
wherein said step of digitally-applying the conductive ink comprises digitally-applying the conductive ink from the printhead of the robotic applicator without the mask on the surface of the curved glass substrate as the robotic applicator moves along the surface of the curved glass substrate; and
wherein said step of curing the conductive ink to form the conductive feature comprises activating the curing device of the robotic applicator to cure the digitally applied conductive ink as the robotic applicator moves along the surface of the curved glass substrate.

19. The method of claim 18, wherein the curing device is a UV curing device, and wherein said step of activating the curing device of the robotic applicator to cure the digitally applied conductive ink to form the conductive feature comprises:
activating the UV curing device to photo-cure the digitally applied conductive ink as the robotic applicator moves along the surface of the curved glass substrate.

* * * * *